(12) United States Patent
Lu et al.

(10) Patent No.: US 8,805,801 B2
(45) Date of Patent: Aug. 12, 2014

(54) METHOD FOR COMPRESSING A .NET FILE

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 96 days.

(21) Appl. No.: 13/129,296

(22) PCT Filed: Dec. 29, 2010

(86) PCT No.: PCT/CN2010/080459
§ 371 (c)(1),
(2), (4) Date: May 13, 2011

(87) PCT Pub. No.: WO2011/079796
PCT Pub. Date: Jul. 7, 2011

(65) Prior Publication Data
US 2011/0264669 A1   Oct. 27, 2011

(30) Foreign Application Priority Data

| Dec. 30, 2009 | (CN) | 2009 1 0244160 |
| Dec. 30, 2009 | (CN) | 2009 1 0244162 |
| Dec. 30, 2009 | (CN) | 2009 1 0244163 |
| Dec. 30, 2009 | (CN) | 2009 1 0244164 |
| Dec. 30, 2009 | (CN) | 2009 1 0244165 |

(51) Int. Cl.
*G06F 17/30* (2006.01)
*G06F 9/445* (2006.01)

(52) U.S. Cl.
CPC ................................ *G06F 9/445* (2013.01)
USPC ........................................................ 707/693

(58) Field of Classification Search
USPC ........................................................ 707/693
See application file for complete search history.

(56) References Cited

U.S. PATENT DOCUMENTS

2007/0079386 A1* 4/2007 Metzger et al. ................. 726/29
2007/0136344 A1* 6/2007 Chen .............................. 707/101
2007/0250811 A1* 10/2007 Ahs et al. ...................... 717/114

OTHER PUBLICATIONS

MSDN Blogs, ".NET System.IO.Compression and Zip Files", posted Apr. 5, 2006, pp. 1-4.*
Gemalto, "Gemalto .NET SDK: Software Development Kit for Gemalto .NET Smart Cards", Apr. 2008, pp. 1-2.*
Gemalto, "Gemalto .NET Technology: Smart Card Implementation of the .NET Technology", Apr. 2008, pp. 1-4.*
Gemalto, "Gemalto .NET v2/v2+ Smart Card User Guide", Jul. 2008, pp. 1-97.*
Michael H. Lutz & Phillip A. Laplante, "C# and the .NET Framework: Ready for Real Time?", IEEE Software, Jan./Feb. 2003, pp. 74-80.*
Milenko Drinic et al., "Code Optimization for Code Compression", IEEE CGO'03, 2003, pp. 1-10.*

(Continued)

*Primary Examiner* — Rehana Perveen
*Assistant Examiner* — Scott A Waldron
(74) *Attorney, Agent, or Firm* — Fay Sharpe LLP

(57) ABSTRACT

The invention discloses a method for compressing a .net file, characterized by at least one of the following steps of obtaining and compressing reference type in a .net tile; obtaining and compressing definition method in a .net file; obtaining and compressing method body of the definition method in a .net file; obtaining and compressing Namespace in a .net file; obtaining and compressing definition type in a .net file. By compressing the .net file, the invention efficiently reduces the storage space occupied by the .net file, and makes it stored in a small-sized medium, such as a smart card.

22 Claims, 23 Drawing Sheets

(56) References Cited

OTHER PUBLICATIONS

William Pugh, "Compressing Java Class Files", ACM SIGPLAN'99, May 1999, pp. 247-258.*

Bruno Cabral et al., "RAIL: Code Instrumentation for .NET", Mar. 2005, ACM SAC'05, pp. 1282-1287.*

* cited by examiner

METHOD FOR COMPRESSING A .NET FILE

FIELD OF THE INVENTION

The invention relates to the computer application field, in particular to a method for compressing a .net file.

BACKGROUND OF THE INVENTION

.net is a new generation of technical platform of MICROSOFT®, a brand-new multi-language software development platform based on internet, following the trend of distributed computing, component-orientation, enterprise-level application, software service-orientation, and Web-focus etc. in software industry. .net is not development language, but the .net platform supports more development language, such as C# language, C++, Visual Basic, Jscript, etc.

Smart card is a plastic card similar with a common name card in size, with a built-in silicon chip around 1 cm in diameter, having functions of storing information and complicated computing. It is widely used in telephone card, financial card, identity authentication card, as well as mobile phone and payment television field etc. The smart card integrates micro processor, memory and input/output unit etc. which makes it the smallest computer in the world. Furthermore, a complete security control system is applied on the smart card with security control program firmed in its ROM, and therefore a password can not be copies. Comparing with the common magnetic card, it has larger size, and stronger functions in aid with its micro-processor.

.net card is a microprocessor smart card with a .net card virtual machine able to run .net program. The virtual machine can be understood as a simulation machine by software, in which processor, memory, and registers are installed, it can simulate running all instructions, and software running on the simulation machine has no special requirement for running environment, and therefore it is transparent to the program running on it. For example, x86 virtual machine simulates the environment of running x86 instructions and c51 virtual machine the environment of running c51 instructions.

A .net program includes Namespace, reference type, definition type, definition method, reference method, intermediate language codes etc., of which the reference type is a data type represented by the real value of a type.

However, the current smart card has limited storage space for small size and limitation in storage chip, and with development of software, some programs of stronger functions occupy more, and therefore more .net programs can not be stored and run.

In sum, the .net program in prior art can not be stored and run on a small-sized storage medium, so far there has no efficient solution for this kind of problem.

SUMMARY OF THE INVENTION

The invention engages in providing a method for compressing a .net file, solving the problem that the .net program can not be compressed efficiently and therefore can not be stored and run on a small-sized storage medium, such as a smart card.

The invention provides a method for compressing a .net file, which comprising at least one of the following steps of obtaining and compressing reference type, definition method, method body of the definition method, Namespace, definition type in a .net file.

By compressing the .net file, the invention efficiently reduces storage space occupied by the .net file, makes the .net file usable in a small-sized device, saves resources and improves the usage efficiency of the resource.

DETAILED DESCRIPTION OF DRAWINGS IN THE INVENTION

The drawings hereafter are only for further understanding the invention, which are part of the invention. The embodiments and descriptions thereof are only for explaining the invention, not a limitation to the invention.

DETAILED EMBODIMENTS OF THE INVENTION

The below is a detailed description of the invention in combination with embodiments and drawings. Particularly, all embodiments and features thereof in the invention can be combined with each other in case of non-collision.

Embodiment 1

Figure 1:
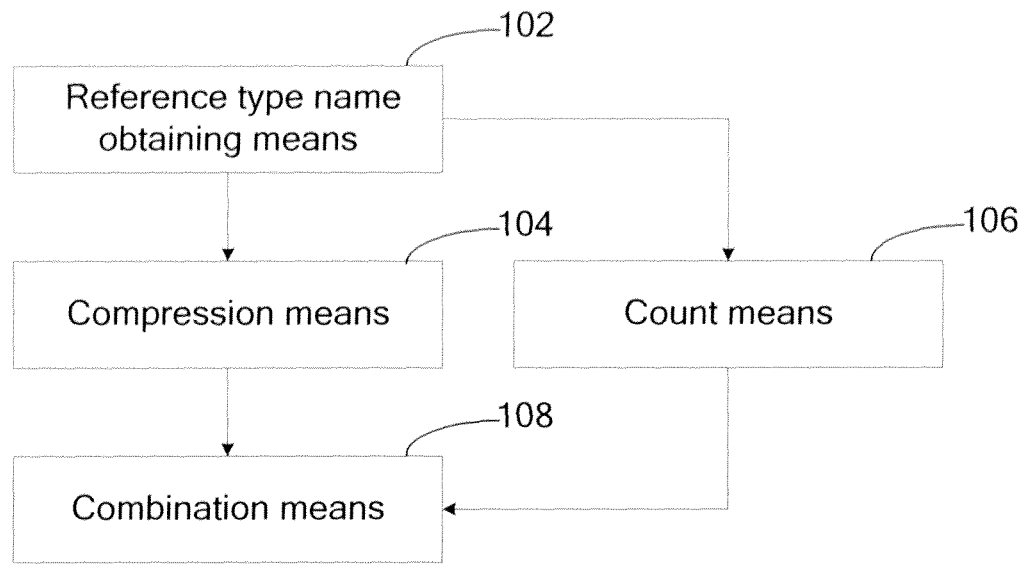
FIG. 1 is a structural block diagram of a device of compressing reference type in a .net file in Embodiment 1 of the invention.

A device of compressing the reference type in a .net File is provided in the embodiment, as shown in FIG. 1, including a reference type name obtaining means 102, a compression means 104, a count means 106 and a combination means 108.

Functions of all the above means are described below: the reference type name obtaining means 102 is for obtaining name of the reference type in a .net file, the compression means 104 for compressing the name of the reference type obtained by the reference type name obtaining means 102; the count means 106 for counting number of methods and fields in the reference type obtained by the reference type name obtaining means 102; and the combination means for combining name of the reference type compressed by the compression means 104, methods and fields counted by the count means 106 according to a prescribed format to obtain a compression result of the reference type.

Figure 2:
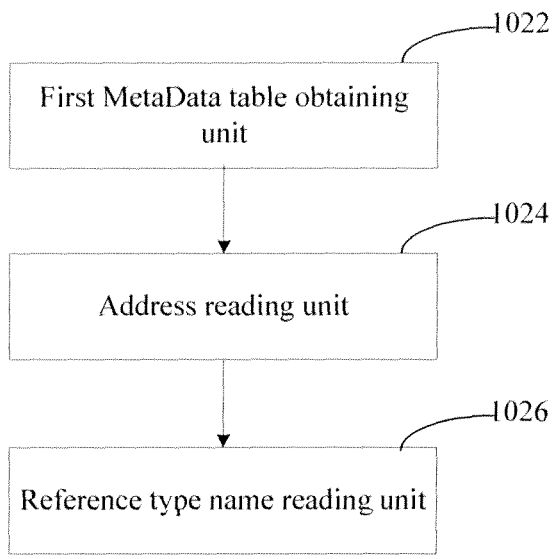
FIG. 2 is a structural block diagram of reference type name obtaining means in Embodiment 1 of the invention.

The reference type name obtaining means 102 can adapt many methods to obtain name of the reference type, and one method adopted by the embodiment, as shown in FIG. 2, a structural block diagram of the reference type name obtaining means, is that the means 102 includes a first MetaData table obtaining unit 1022 for obtaining a first MetaData table from the .net file which includes more tables, and in the embodiment the TypeRef table is selected as the first MetaData table, in which name of the reference type used in the .net file and the Namespace to which the reference type belongs are recorded; an address reading unit 1024 for reading the address of the name of the reference type in a .net file, from the first MetaData table obtained by the first MetaData table obtaining unit 1022; and a reference type name reading unit 1026 for reading the name of the reference type according to the address read by the address reading unit 1024.

Preferably, the algorithm adopted by the compression means 104 can be hash algorithm, specifically, MD5, SHA-1 or SHA-2 etc.

The count means 106 can count methods and fields according to information recorded in a second MetaData table which refers to the MemberRef table in the .net file, and each line of the table records the reference type information and Signature. According to the data in the reference type information, the reference type recorded in some line to which the data in current line points in the TypeRef table and name thereof are obtained; and data in the Signature item refers to whether data recorded in the current line refers to a method or field and according to the data, methods and fields corresponding to the name of each reference type is counted.

Preferably, the prescribed format in the combination means 108 is fixed-length bytes, which include three parts, the compressed reference type name, method count, field count, and the three parts can be combined as required.

The purpose for containing method and field counts in the compression result of the reference type is that when other parts in the .net file are compressed correspondingly, the compressed reference type can be used normally by the retrieved method with the method count and the retrieved field with the field count.

The compression means 104 in the embodiment compresses name of the reference type obtained by the reference type name obtaining means 102, and the combination means 108 combines the name of the reference type compressed by the compression means 104 with method and field count counted by the count means 106 to obtain the compressed reference type, which efficiently reduces the storage space occupied by the .net tile, making it stored and run in a small-sized storage medium, and therefore improves function of the small-sized storage medium.

Embodiment 2

Figure 3:
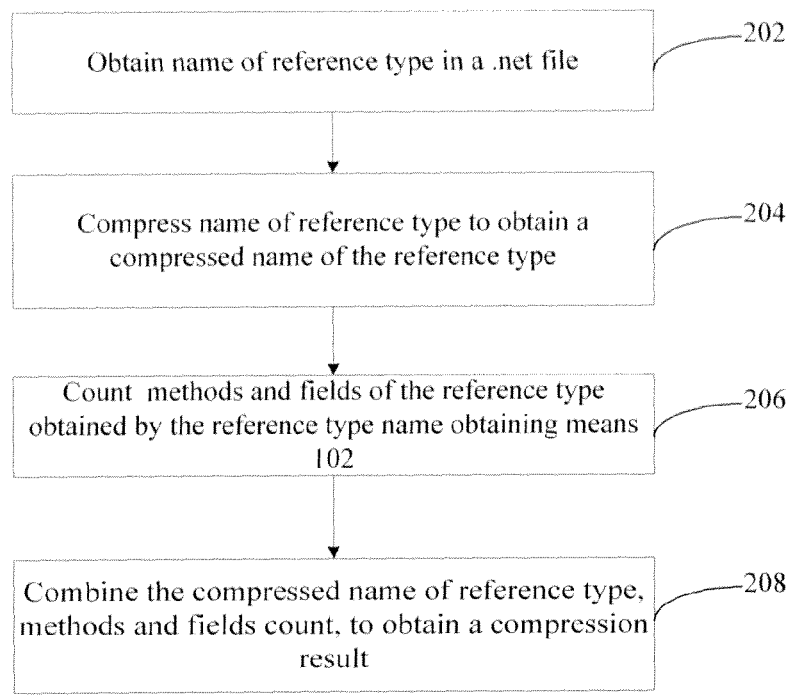
FIG. 3 is a flow chart of a method for compressing reference type in a .net file in Embodiment 2 of the invention.

A method for compressing the reference type in a .net file is provided in the embodiment as shown in FIG. 3, which is described by running it in the device of embodiment 1, including Step 202, obtain name of the reference type used in a .net file;

Step 204, compress name of the reference type and obtains the compressed reference type name;

Step 206, count methods and fields of the reference type obtained by the reference type name obtaining means 102;

Step 208, combine the compressed reference type name and methods count and fields count and obtain the compression result of the reference type.

Preferably, Step 202 further includes steps of obtaining the first MetaData table from the .net file; reading address information of name of the reference type used in the .net file from the first MetaData table and reading the name of the reference type according to the address.

Preferably, Step S202 can further include a step of generating a reference type name string according to the obtained reference type name by either method below.

Firstly, convert the above obtained reference type name into a prescribed coding format, such as ASCII code, to generate the reference type name string; secondly, obtain the Namespace name to which the reference type name belongs, and combines the Namespace name with the above reference type name to create the reference type name string.

The compressing the above reference type name includes steps of performing Hash operation, with algorithm such as MD5, SHA-1 or SHA-2 etc., on the above reference type name or the generated reference type name string, to obtain a hash value, taking prescribed bytes of the hash value as the compressed reference type name.

Preferably, counting methods and fields includes steps of obtaining the second MetaData table; performing the below operations, on each line of the table, of reading the reference type to which data in current line points from the second MetaData table; if the read reference type name is concurrent with that obtained, determining whether data recorded in the current line represents a method by the Signature item in the current line, if yes, adding 1 to the method count of the reference type; otherwise, adding 1 to the field count of the reference type.

Preferably, the prescribed format mentioned is fixed-length bytes, including three parts, the compressed reference type name, method count and field count.

The first MetaData table and the second MetaData table can specifically refer to the MetaData table in embodiment 1, so detailed description of it is eliminated.

The method provided in the embodiment is realized by the compression device provided in embodiment 1. The method adapts steps of compressing the obtained reference type name, combining the compressed reference type name, counted method count and field count together to obtain a compressed reference type, which efficiently saves the storage space occupied by a .net file and gets the .net file stored and run on a small size storage medium, such as a smart card, and therefore perfecting the function of the small size storage medium, such as a smart card.

Embodiment 3

A method for compressing the reference type in a .net file is provided in the embodiment, in which the non-compressed file compiled by a .net platform is named as a .net file.

Figure 4:
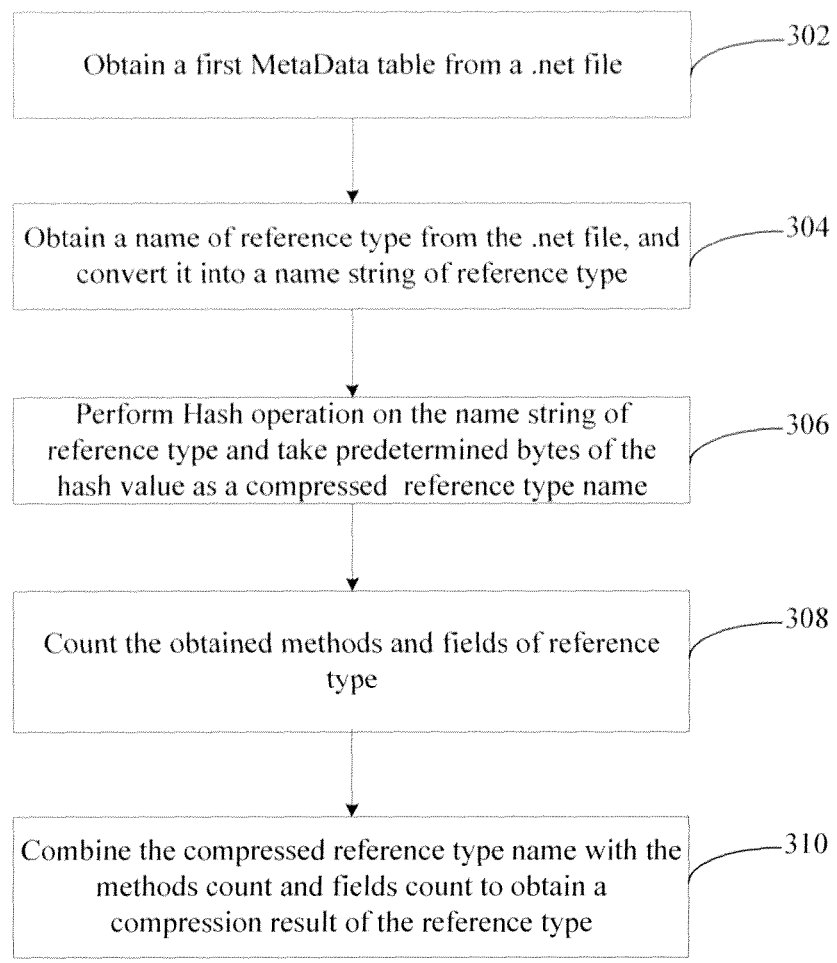
FIG. 4 is a flow chart of a method for compressing reference type in a .net file in Embodiment 3 of the invention.

A method for compressing the reference type in a .net file is provided, as shown in FIG. 4, including steps from 302 to 310 as follows.

Step 302, obtain a first MetaData table from a .net file, which specifically refers to the TypeRef table.

There are many tables in the .net file, of which theTypeRef table records name of the reference type in a .net file and Namespace information to which the reference type belongs.

MetaData tables are part of a Portable Executable file, and specifically a description will be given to the .net file obtained by compiling the below codes.

```
namespace MyCompany.MyOnCardApp
{
    public class MyService : MarshalByRefObject
    {
        static Version ver = new Version(1, 1, 1, 1);
        static Int32 callCount = 0;
        static ClassB classb = new ClassB( );
        String strResult = Boolean.FalseString;
        public String MySampleMethod( )
        {
            String strHello = "Hello World !";
            return strHello + callCount.ToString( );
        }
    }
    public class ClassB{ }
    public struct StructB{ }
}
```

Figure 5:
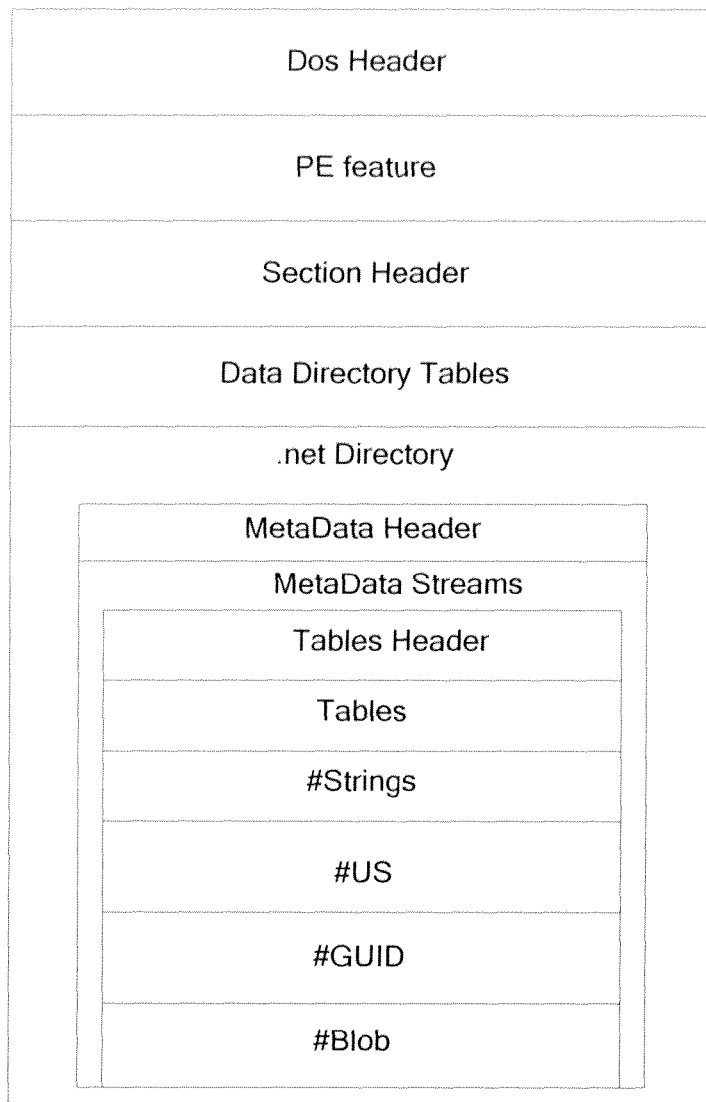
FIG. 5 is a structural profile of a .net file provided in Embodiment 3 of the invention.

Compile the above codes on a .net platform to obtain a helloworld.exe file, store the helloworld.exe file in binary format on a hard disk, and the stored binary file is a .net file, as shown in FIG. 5 (a structural block diagram of the .net file in the embodiment), which includes a DOS header, PE feature, and MetaData which includes MetaData Headerer and tables, etc.

The below is a description of the process of obtaining the TypeRef table, including steps of:

Step a, locate DOS header of the .net file, specifically 0x5a4d in the embodiment;

Step b, read offset of the PE feature, 0x00000080, after jumping a first prescribed bytes (0x003a bytes in the embodiments) from the DOS header;

Step c, locate PE feature 0x4550 according to the offset of the PE feature, 0x00000080;

Step d, read 4 bytes after moving a second prescribed bytes from the PE feature;

specifically, for a 32-bit machine, the second prescribed bytes are 0x0074 bytes, the 4 read bytes are 0x00000010 which disclose that there are 0x10 directories and .net data in the binary file;

the relative virtual address of the MetaData headerer of the .net file is recorded in the 0x0F directory, while for a 64-bit machine, the second prescribed bytes are 0x0084 bytes;

Step e, read 8 bytes after moving a third prescribed bytes from the above 0x00000010.

Specifically the third prescribed, bytes are 112 bytes, of which the first four 0x00002008 refer to the relative virtual address of .net data headerer and the following four 0x00000048 to length of the .net data headerer;

Step f, obtain the linear address 0x00000208 according to the relative virtual address of the .net data headerer, and the below data by reading the .net data headerer:

48000000020005008C210000A0090000
09000000050000060000000000000005
02000008000000000000000000000000
00000000000000000000000000000000
0000000000000

Particularly, the above data is stored in a little-endian order, for example, the first fourth bytes of the data 0x48 000000 refer to the length of the data, which will be 0x0000048 in big-endian order;

Specifically, the linear address refers to the address where the .net data is stored in the .net tile, the relative virtual address refers to the memory offset relative to the PE loading point, and the conversion formula between the two addresses is linear address=relative virtual address−section relative virtual address+section file offset, specifically read the relative virtual address of the section of the .net data directory in the .net file, 0x00002000, the section file offset is 0x00000200, the linear address is 0x00000208 by 0x00002008−0x00002000+0x00000200;

Step g, read 8 bytes after moving fourth prescribed bytes from the .net data headerer, of which the first four 0x0000218c refer to the relative virtual address of MetaData Headerer and the following four 0x000009a0 to the length of MetaData;

Step h, convert the relative virtual address 0x0000218c of the MetaData headerer to obtain the linear address 0x0000038c, and obtain the content of MetaData by the linear address and length of the MetaData;

Step i, keep reading from the start of the MetaData Headerer, when reaching to the symbol #~, reading 8 bytes before the symbol #~, of which the first four refer to address of #~ stream and by the address the #~ stream can be obtained, and read 8 bytes from the start of the fifth prescribed bytes in the #~ stream, that is 0x0000000920021c57 viz.

1001001000000000001000011100010101111 in binary format;

Specifically, the fifth prescribed bytes refers to the ninth byte from the start of the #~ stream.

Step j, read from the start of the lowest bit of the binary data obtained in Step i.

For example, the first bit refers to whether there is Means table, and the first bit 1 represents yes and 0 represents not; specifically there is Means table in the embodiment; the second bit 1 represents that there is TypeRef table; in sum, each bit of the data obtained in Step i, from the lowest bit beginning, refers to whether there is a corresponding table in the .net file.

Step k, read number of lines of the TypeRef table after moving a prescribed six bytes from 0x0000000920021c57 viz. read 4 bytes 0x0000001e after moving 12 bytes from 0x0000000920021c57, and determine that there are 30 lines in the TypeRef table.

Specifically, every 4 bytes of the data after moving 8 bytes from 0x0000000920021c57, store a number of lines of an available MetaData table in the .net file, and following the data representing all numbers of lines store contents in each MetaData table, which refer to the MetaData table section.

Step l, read contents of the TypeRef table according to a prescribed method.

Specifically in the .net file, the prescribed method is if there is Module table according to the determination step in Step j, read the number of lines in the Module table, 1; because each line of the Module table occupies 10 bytes, therefore after moving 10 bytes in the Module table section, the eleventh byte refers to contents in the TypeRef table; and because there are 30 lines in the TypeRef table with each occupying 6 bytes, therefore the length of the TypeRef table is 180 bytes by 30×6.

Part of data in the TypeRef table is listed as follows:
0600 6100 5A00
0600 7400 5A00
0600 7B00 5A00
0600 8500 5A00
0600 EF00 DD00
0600 0801 DD00
0600 2101 DD00
0600 3C01 DD00

The above data refers to data in the first 8 lines of the TypeRef table in .net file, specifically in the embodiment, there are 30 lines in the TypeRef table, and method for processing the rest data is the same with that described above, thus it is eliminated hereafter.

In each line of the above data, from high to low hit, the first two bytes refer to code signature of type parsing field, the third and fourth bytes refer to the offset of the reference type name in the #Strings stream, the latest two bytes refer to offset of the Namespace name in the #Strings stream, for convenience of description, Table 1 is given as below.

TABLE 1

| Resolution Scope | Type Name | Namespace |
| --- | --- | --- |
| 0060 | 0061 | 005a |
| 0060 | 0074 | 005a |
| 0060 | 007b | 005a |
| 0060 | 0085 | 005a |
| 0060 | 00ef | 00dd |
| 0060 | 0801 | 00dd |
| 0060 | 0121 | 00dd |
| 0060 | 013c | 00dd |

Particularly, data in the table is stored in big-endian format, e.g. 0060, 0061, 005a in the first line corresponds to 0600 6100 5a00 in little-endian format.

When using the compression method provided by the embodiment, method counts of all reference types (numbers of methods included in reference types in the .net file) are set to be 0, and field counts of all reference types in hers of fields included in reference types in the .net tile) are also set to be 0;

Step 304, read name of the reference type in the .net file and convert it into the reference type name string.

After obtaining the offset of the reference type name relative to the #Stings stream in step 302, the method for obtaining the reference type name is given a description by selecting the first reference type in the TypeRef table, the reference type pointed by the relative offset 0x0061, including steps as follows. After obtaining address of the MetaData header, 0x0000038c in step h of Step 302, keeping reading data from beginning of the header, when reaching the symbol #Strings, reading 8 bytes before the symbol #Strings, 0x5C0300003C040000, of which the high four bytes 0x5C0300003C040000 refer to the offset of the #Strings stream relative to the MetaData header, corresponding to 0x0000035c in big-endian format, and the low four bytes refer to length of the #Strings stream, corresponding to 0x0000043c in big-endian format.

Obtaining the data section of the #Strings stream after an offset of 0x0000035c from the MetaData header address 0x0000038c, moving 0x0061 from beginning of the #Strings stream header according to the offset of the first reference type in the TypeRef table, keeping obtaining data till reaching 00 to obtain the first reference type name 0x4D61727368616C42 795265664F626A656374; converting the first reference type name by the ASC II codes to obtain the reference type name string MarshalByRefObject.

Methods for reading and converting names of other reference types are the same with that of the first reference type, and therefore more descriptions are eliminated.

The reference type name string can he obtained by the below steps: obtaining the reference type name, obtaining the Namespace name to which the reference type belongs, combining the Namespace name with the reference type name to obtain the reference type name string with the connector "•".

For example, if the Namespace to which the first reference type belongs is System, the reference type name string converted from the first reference type name, with the above method will be System. MarshalByRefObject.

Step 306, perform Hash operation on the reference type name string and take prescribed bytes of the hash value as the compressed the reference type name;

The Hash algorithm can be MD5, SHA-1 and SHA-2 etc. Specifically in the embodiment, perform hash operation with MD5 algorithm on the reference type name string MarshalRyRefObject obtained in Step 304 to obtain a 120-hit MD5 value 3064A1363C4B4DC57770E9BDF25B7547D and take the first two bytes of the MD5 value as the compressed reference type name, 3064.

Particularly, the compression result can he obtained by reading and compressing the name of the reference type subsequently according to the order from steps 302 to 306, also can be obtained by firstly obtaining names of all reference types in the .net file, secondly compressing all the names one by one and thirdly buffering the compression result.

Step 308, count the above obtained methods and fields of the reference type.

Figure 6:
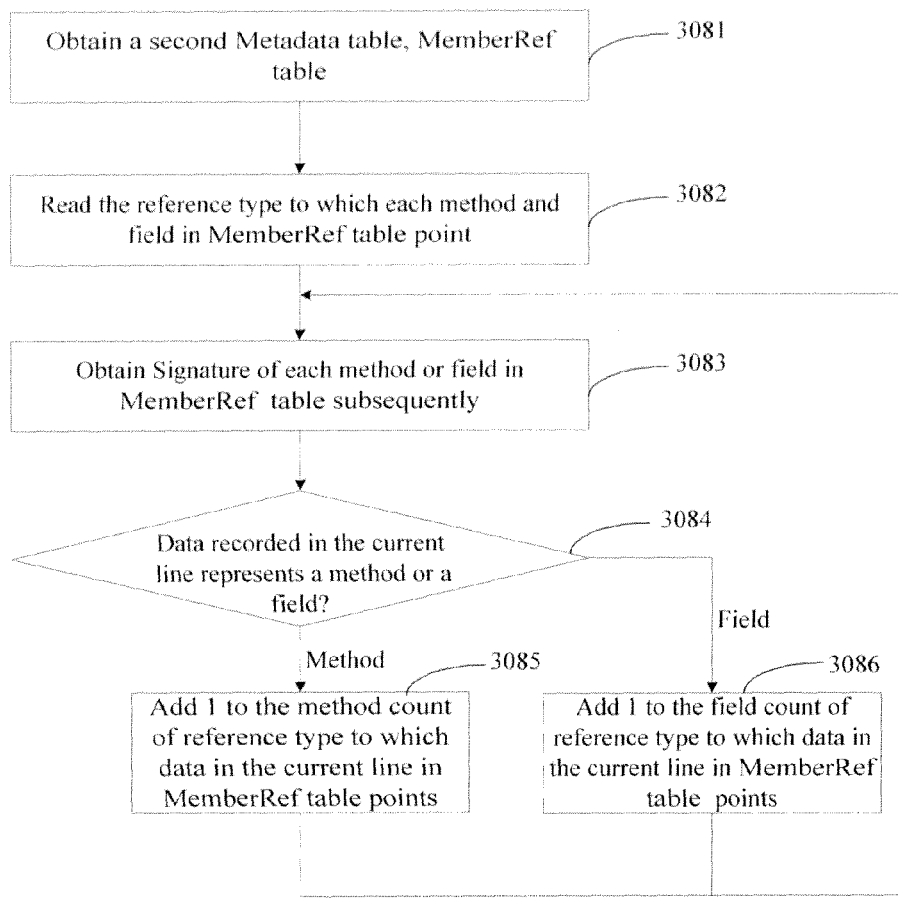
FIG. 6 is a flow chart of a method for counting methods and fields of reference type in Embodiment 3 of the invention.

A method for counting the method count and field count of the reference type is provided in combination with a flow chart as shown in FIG. 6, with steps as follows.

Step 3081, obtain a second MetaData table, the MemberRef table, including steps as below. Known from the binary data 10010010000000000100001110001010111 obtained in step i, the step of obtaining the TypeRef table in Step 302, the eleventh bit of the binary data is 1, which represents that there is MemeberRef table, and there are five 1 before the eleventh bit, which represents that there are 5 other table before the MemberRef table.

Known from the step k, there are 23 lines in the obtained MemberRef table, and 50 lines in the first fifth tables before the MemberRef table, one line for Module table, 30 lines for TypeRef table, 6 lines for TypeDef table, 7 lines for Field table and 6 lines for Method table.

Known by the prescribed method in step 1 of Step 302, each line occupies 10 bytes in Module table, 6 bytes in TypeRef table, 14 bytes in TypeDef table, 6 bytes in Field table and 14 bytes in Method table;

So the offset of the MemberRef table in MetaData tables is 400 by 1×10+30×6+6×14+7×6+6×14=400, and contents in the MemberRef table can be obtained after an offset of 400 bytes from the MetaData tables, each line of MemberRef table occupies 6 bytes and total 23 lines are available, and therefore the length of MemberRef table 138 bytes can obtained by 23×6;

part of data in MemberRef table is as follows, which includes data in the first 8 lines of MemberRef table, methods for processing other data are the same with the above-mentioned, and therefore it is eliminated herein.

2900 C000 4300
3100 C000 4300
3900 C000 4800
4100 C000 4300
4900 C000 4300
5100 C000 4300
5900 C000 4300
6100 C000 4300

Information of methods and fields of the reference type is stored in the MemberRef table each line of the information records a reference signature of one method or field. Of the information, the upper 2 bytes in each line refer to the reference type to which the method or field points, the middle 2 bytes refer to the name of the method or field, and the lower 2 bytes refer to the offset where the signature of the method or field is stored in the #Blob stream; the reference signature records whether the line represents a method or field, and a returning value etc.

For convenience of explanation, the data in the above 8 lines is listed in table 2.

TABLE 2

| Class | Name | signature |
|-------|------|-----------|
| 0029  | 00c0 | 0043      |
| 0031  | 00c0 | 0043      |
| 0039  | 00c0 | 0043      |
| 0041  | 00c0 | 0043      |
| 0049  | 00c0 | 0043      |
| 0051  | 00c0 | 0043      |
| 0059  | 00c0 | 0043      |
| 0061  | 00c0 | 0043      |

Step 3082, read the reference type to which each method or field in MemberRef table points;

As shown table 2, the upper two bytes record the reference type to which the method or field of the line points. An explanation is given for the first line of data in the MemberRef table, in the first line, Class is 0x0029, convert 0x0029 to binary data 101001, shift it 3 bits right to obtain 101, convert 101 to decimal data 5. As a result, the field or method in the first line in the MemberRef table refers to the reference type recorded in the fifth line of the TypeRef table, and the reference type name, AssemblvKevNameAttribute, recorded in the fifth line in the TypeRef table, can be obtained with the methods in step 302 and 304.

Step 3083, obtain the signature of each method or field in the MemberRef table one by one.

As shown in table 2, the lower 2 bytes in each line of the MemberRef table refer to the offset where the signature of each field or method is stored in the #Blob stream, and the method for obtaining the signature of each method or field in the MemberRef table is as follows.

Locating the #Blob stream with steps of, after obtaining the address of the MetaData header in step h of step 302, keeping reading data from beginning of the header, when reaching a symbol #Blob, reading 8 bytes before the symbol #Blob to obtain data 0x E4070000BC010000, of which the upper fourth bytes refer to the offset of the #Blob stream from the MetaData header location, corresponding to 0x000007e4 in big endian format, the lower four bytes refer to the length of the #Blob stream, corresponding to 0x000001bc in big endian format; the data section of the #Strings stream being obtained by the compression program moving forward 0x000007e4 to obtain the data section of the #Strings stream according to the address of MetaData header 0x000003 8c.

An explanation is given by reading first line of data in the MemberRef table. The offset of the first line signature is 0x0043, and according to the offset in the #Blob stream, obtain the first line signature 0x2001010e.

Step 3084, determine whether data in the current line refers to a method or a field according to the read signature, if it refers to a method, go to step 3085; if a field, go to step 3086;

A description is given of the signature read from the first line of data in the MemberRef table. The step of determining a method or field according to the signature is as follows.

The signature read from the first line is 0x2001010e, particularly in the embodiment, if the latest fourth 4 bits of the signature are 0x060e, it determines that the current line records a field; otherwise, the current line records a method; and a conclusion can be taken that the first line records a method in the table, viz, the reference type AssemblvKevNameAttribute refers the method recorded in the first line of the MemberRef table.

Step 3085, add 1 to the method count of the reference type to which data in the current line in the MemberRef table points, and go hack to step 3083.

Step 3086, add 1 to the field count of the reference type to which data in the current line in the MemberRef table points, and go hack to step 3083.

The method and field counts of the reference type in the .net file are obtained by methods provided in Step 3081-3086 after reading all data in the MemberRef table.

Particularly, the order of steps of 302-306 and step 308 can be reversed, viz. the 308 can be firstly executed, and from which the same result will be gotten.

Step 310, combine the compressed reference type name, with the method and field counts of the reference type to obtain the compression result of the reference type according to a prescribed format.

Specifically, the prescribed format can be that shown as in FIG. 3, which includes fixed-length bytes, as required, comprised of three parts, the compressed reference type name, method and field counts of the reference type.

TABLE 3

| Compressed name of the reference type | Method count | Field count |
|---|---|---|

The compressed reference type is obtained by the structure shown in Table 3 which combines the compressed reference type name with the method and field counts of the reference type, if the method or field count is 0, fill the method or field count with 0x00, for example, the compression result of the reference type MarshalByRefObject is 0x30640100.

The compression structure as shown in Table 3 is just a preferred structure, which can be changed, for example, set the field and method counts behind the reference type name, or change the value of the method and field counts etc.

The below is a compression result of the reference type in the .net file.

```
(0)8E3B 0100 0000
   //System.Runtime.CompilerServices.RuntimeHelpers
(1) DB8C 0100 0000
   //.HelloWorld.exe.3805F8269D52A5B2.
(2) 81CE 0000 0000 //System.Void
(3) 2711 0100 0000 //System.String
(4) 2722 0000 0100 //System.Boolean
(5) 3064 0100 0000 //System.MarshalByRefObject
(6) 34B6 0100 0000 //System.Version
(7) C061 0100 0000 //System.Int32
(8) A245 0000 0000 //System.Byte
(9) 4410 0000 0000 //System.Array
(10) 4970 0100 0000 //System.Object
(11) ED88 0000 0000 //System.ValueType
(12) A1FA 0100 0000 //System.Type
(13) CB0F 0100 0000
   //SmartCard.Runtime.Remoting.Channels.APDU.APDUServer
   Channel
(14) D9F8 0100 0000
   //System.Runtime.Remoting.Channels.ChannelServices
(15) F55B 0100 0000
   //System.Runtime.Remoting.RemotingConfiguration
```

The above data is shown in little endian format, of which the first two bytes refer to the compressed reference type name, the middle two bytes to the method count, and the last two bytes to the field count, that following the symbol "//" to the reference type name string in the .net file. It can be concluded from the above compression result, the method provided in the embodiment has advantage of reducing the storage space occupied by a .net file by compressing the reference type, and therefore lowers the limitation to the storage space by the .net file.

Particularly, steps in the flow chart of the drawings can be implemented in a computer system, and although a logical order has been given in the flow chart, in some circumstances, it can be different from that given.

Embodiment 4

Figure 7:
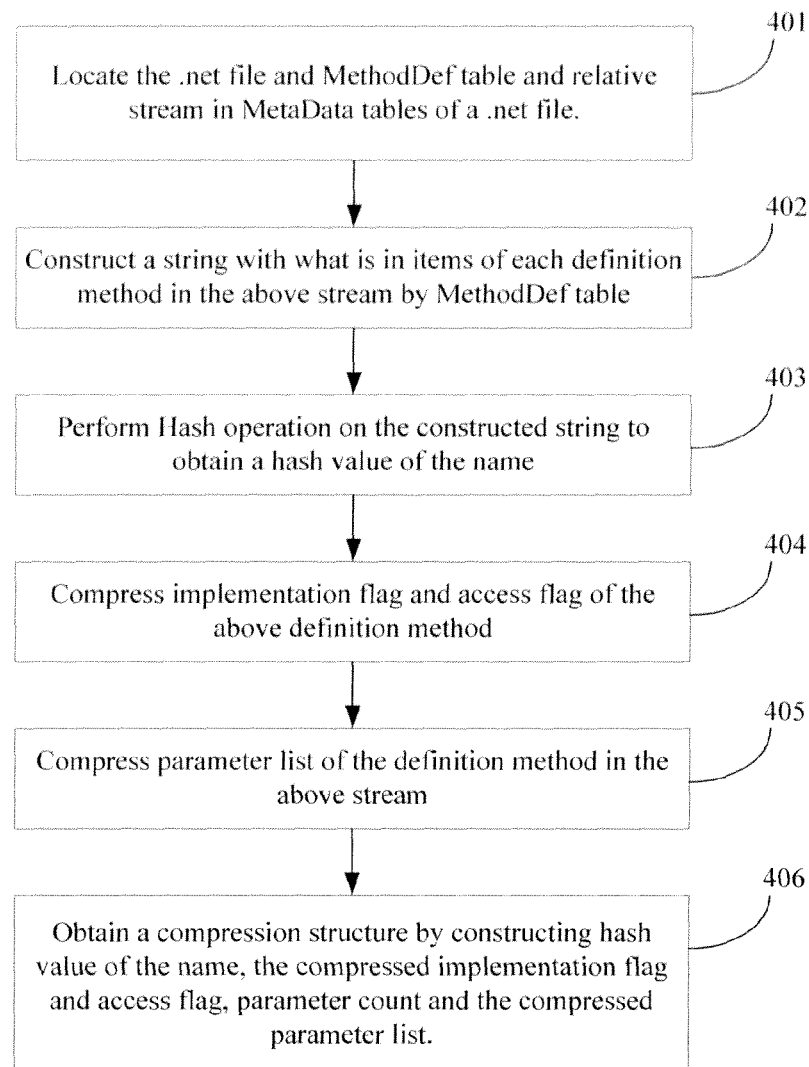
FIG. 7 is a flow chart of a method for compressing definition method in a .net file in Embodiment 4 of the invention.

A method for compressing definition method in a .net file is provided in the embodiment, as shown in FIG. 7, including steps as follows.

Step 401, locate a .net file, and the MethodDef table and related streams in the MetaData tables of the .net file according to the .net file.

Step 402, construct a string with the content in items, including a parameter count, of each definition method in the above streams according to the MethodDef table.

Step 403, perform Hash operation on the constructed string to obtain a hash value of the name.

Step 404, compress the implementation flag and accessing flag of the above definition method.

Step 405, compress the parameter list of the definition method in the above streams.

Step 406, combine the name hash value, compressed implementation flag and access flag, parameter count and compressed parameter list together according to a prescribed rule, to obtain a compression structure.

The .net file includes a file header, which stores the beginning address, item description of the above MetaData tables and size of each item in byte. With the beginning address and size of each item in byte, addresses of the MetaData steam, String stream, Blob stream, GUID stream and US stream etc, are obtained, therefore the above streams can be located, The embodiment reduces the storage space occupied by the .net file by compressing the definition method in the .net makes the .net file usable in small-sized device; and saves resources and thus improves their usage efficiency.

Embodiment 5

Figure 8:
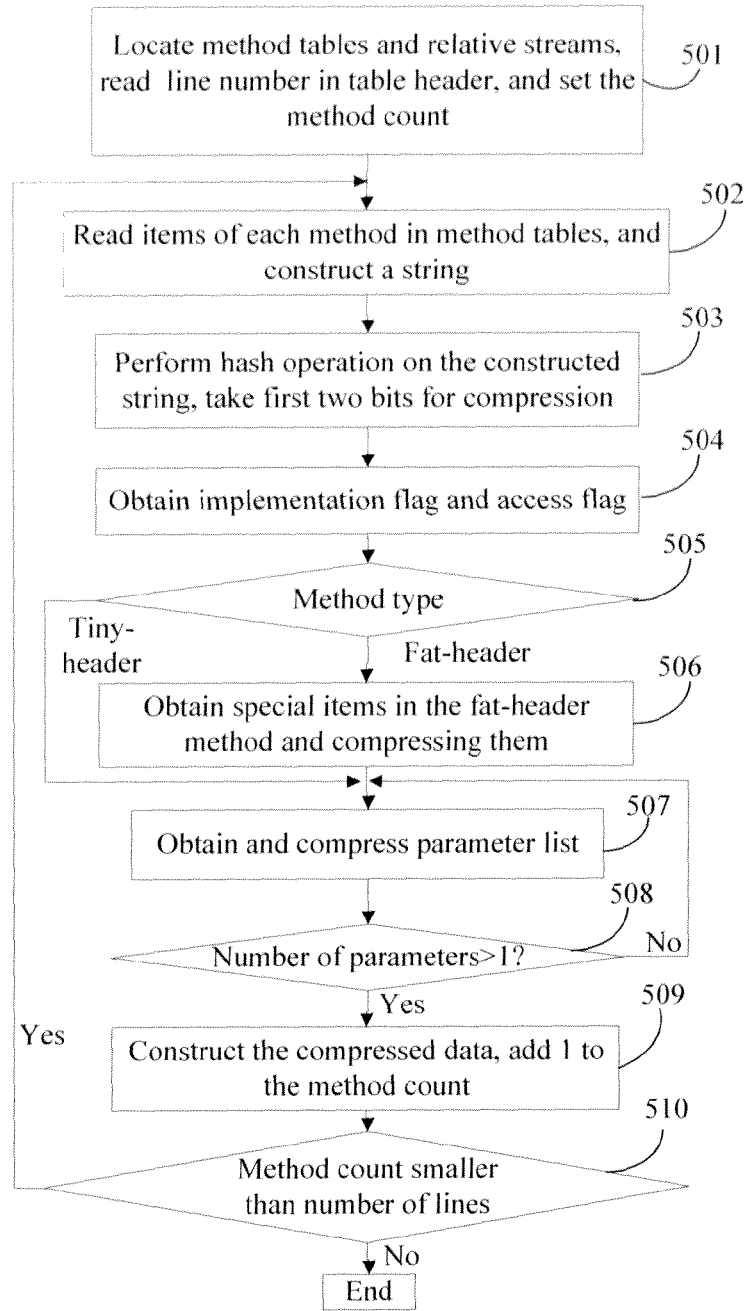
FIG. 8 is a flow chart of a method for compressing definition method in a .net file in Embodiment 5 of the invention.

A method for compressing definition method in a .net file is provided in the embodiment, as shown in FIG. 8, including steps as follows.

Step 501, locate the MethodDef table in the MetaData tables and relative streams according to the PE file structure and the .net file, read number of lines of the method table from the table header which refers to the number of methods; set the method count;

The locating step includes that locating the .net file by the content in the header of PE file, locating addresses of all streams (including MetaData stream, String stream, Blob stream, GUID stream, User String stream) in the .net file by the content in the header of the .net file, and size of all the streams. The .net file is comprised of storage signature, storage header, stream header and six data streams. The size of the storage signature is fixed, so is that of the storage header, name, size and offset of each stream are stored in the stream header, with them six streams of the .net tile are located. In the embodiment, the String stream, Blob stream and MetaData stream are used.

After locating the MetaData stream, a further step of locating, the MetaData tables in the stream is included. The MetaData stream is comprised of MetaData header, table count and MetaData tables. The size of the MetaData header is constant. There is a field of 8 bytes, MaskValid, in the MetaData stream, which flags bit vectors for all tables. Each bit of the bit vectors refers to a table, having two selective values 0 or 1, of which, 0 means the table to which the bit vector points unavailable, and 1 means the table to which the bit vector points available. So far, total 44 types of tables are defined in MetaData mode, and each bit vector described above points to one type of MetaData table. The value of each bit reflects whether a corresponding table is available. For example, the seventh bit of the bit vector corresponds to the MethodDef table, if the value of it is 1, it means that there is MethodDef table. Therefore, the MetaData header identifies how many tables are available in the MetaData tables.

The table count defines 4-byte data for each table identified above, which identifies the number of lines in each table, and length of data in each line of each table is prescribed. For the constant length of the MetaData header and of bytes of the table count, the MetaData table can be located from the MetaData stream.

Specifically, the step of locating the MethodDef table from the MetaData tables is as follows. The MetaData tables store different types of tables in order, the number of which can be obtained by the above MaskValid field of the MetaData tables. There are many lines in each table, the number of lines is prescribed by the table count, so is the length of each line, and thus the locating can be implemented by computing the length of all tables before the MethodDef tables.

Each line of the MetaData tables relates to one method. Each method has a data item table, in which part items relate to the prescribed streams, for example, the Name item relates to the String stream. Space occupied by each method in the table is constant, and so the data item address can be located, and then from the address, the data item can be read.

Setting the method count specifically is setting the initiation value of the parameter I to be 1, which refers to the number of the compressed methods.

Step 502, read all items in each method in the MethodDef table, and construct a string according to the content in the obtained item.

Each method in the method table includes items of

RVA item, an unsigned integer of 4 bytes, a relative virtual address of the method body, which points to read-only sections of PE file; ImplFlags item, an unsigned integer of 2 bytes, a binary flag, which refers to the method for implementing a method; Flags item, an unsigned integer of 2 bytes, a binary flag for identifying whether a method can be accessed or not along with other binary features; Name item, name of a method, offset in the #Strings stream, relating to a string stream, which indexes a string in UTF-8 coding format in size of larger than 0 and smaller than 1023 bytes; Signature item, an offset in the #Blob stream, a method feature, relating to the Blob stream, which indexes a Blob stream larger than 0 in size; ParamList item, a record index (RID of the parameter list), offering the beginning position of the parameter list which belongs to a method.

The beginning position of the parameter list of the next method or the ending position of the parameter list offers the ending position of the parameter list.

Figure 9:
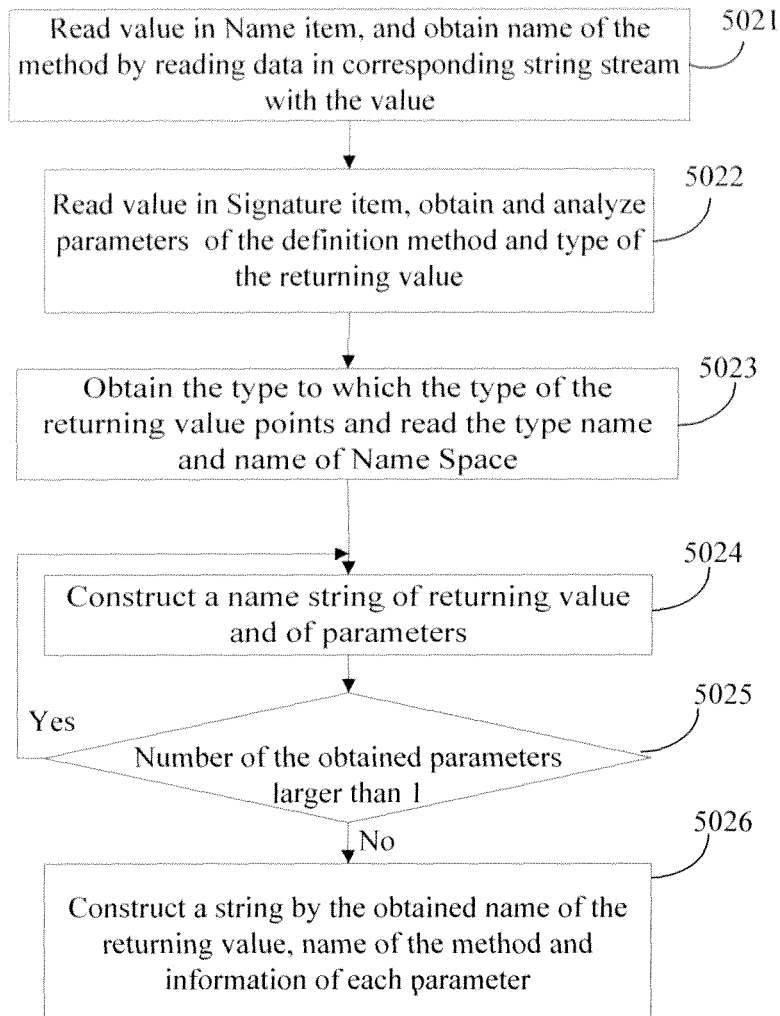
FIG. 9 is a flow chart of a method for constructing a string with definition method in a .net file in Embodiment 5 of the invention.
Figure 10:
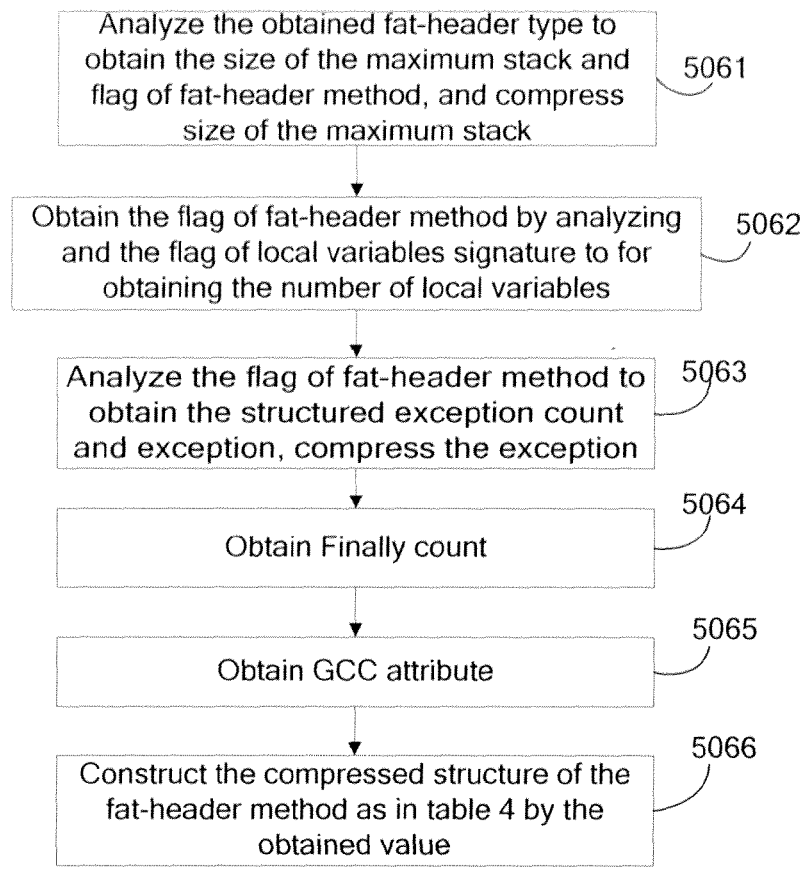
FIG. 10 is a flow chart of a method for compressing special items of a fat-header method in Embodiment 5 of the invention.

As shown in FIG. 9, a flow chart of a method for constructing a string with content in the definition method of the .net file, the method for constructing a string includes steps as follows.

Step 5021, read a value of the Name item from the above items, and data in the String stream according to the value, to obtain the method name.

The value in the Name item discloses the offset of the Name item in the String stream, and the method name, such as MySampleMethod, can be read from the String stream by the offset.

Step 5022, read a value of the Signature item, data in the corresponding Blob stream, obtain and analyze the parameter information of the definition method and the returning value type, of which the parameter information includes number of parameters and type of each etc.

The Signature item refers to Signature in the above table, known from the above table, the value in the Signature item discloses the offset of the item in the Blob stream, read the signature information, from the Blob stream by the offset, that are some parameter information (number of parameters and type of each etc.) and the returning value information (including the returning value type), of which the returning value type refers to the type of other type of tables to be used when using the definition method.

Step 5023, obtain the type information to which the returning value type points from the TypeDef or TypeRef table according to the returning value type, and read the type name and NameSpace name etc. from the String stream according to the offset recorded in the Name and NameSpace item.

Step 5024, construct a returning value full-name string with the obtained Namespace name and type name in a preferred format of "Namespace name•Type name"; read the parameter type name and Namespace name by the obtained parameter type, and construct a parameter full-name string in a preferred format of "Namespace name•Type name".

Step 5025, determine whether the number of parameters obtained in Step 1022 is larger than 1, if yes, go back to Step 5024 and obtain information of each parameter; if not, go to Step 5026.

Step 5026, construct a string with the returning value full-name string and parameter full-name string obtained in Step 5024, method name obtained in Step 5021, and information of each parameter obtained in Step 5022.

The constructed string is in a preferred format such as the returning value full-name string, method name and parameter full-name string etc. (if any).

Step 503, perform hash operation on the string obtained in Step 102, convert the first two bits of the operation result into a value type and store it, which is the hash value of the method name.

The definition method is compressed by performing hash operation on more items obtained in Step 502, and take part value of them.

Step 504, obtain ImplFlags and Flags of the definition method and compress them, which specifically includes of recombining the ImplFlags item and Flags item, discarding part of the items and compressing the 4-byte flag items to a 2-byte flag.

Step 505, determine type of the method, if it is a fat-header method, set type of the method in the Flag item to be 1, which refers to a fat-header method, and go to step 506; otherwise, it is a tiny-header method, go to step 507.

The determining includes steps of analyzing the RVA value in the Method item obtained in step 502, and locating the method header information according to the RVA value, analyzing the first byte of the method header information. Of the first byte, the two lower bits refer to the method header type, if they are 2 (0010), the method is a fat-header method; if they are 3(0011), the method is a tiny-header method.

Step 506, obtain the items special for the fat-header method, and compressing them.

The method for compressing special items for the fat-header method, as shown in FIG. 4, a flow chart thereof, includes steps as follows.

Step 5061, analyze the type information of fat-header method obtained in step 505 to obtain the maximum stack size and the fat-header method signature, compress the data, of describing the maximum stack size, which occupies 2 bytes in the original structure, take the higher 8 bits of the 2 bytes and discard the lower 8 bits of the 2 bytes.

Step 5062, analyze the fat-header method signature obtained in step 505 to obtain the local variables signature and thus the number of the local variables.

Figure 11:
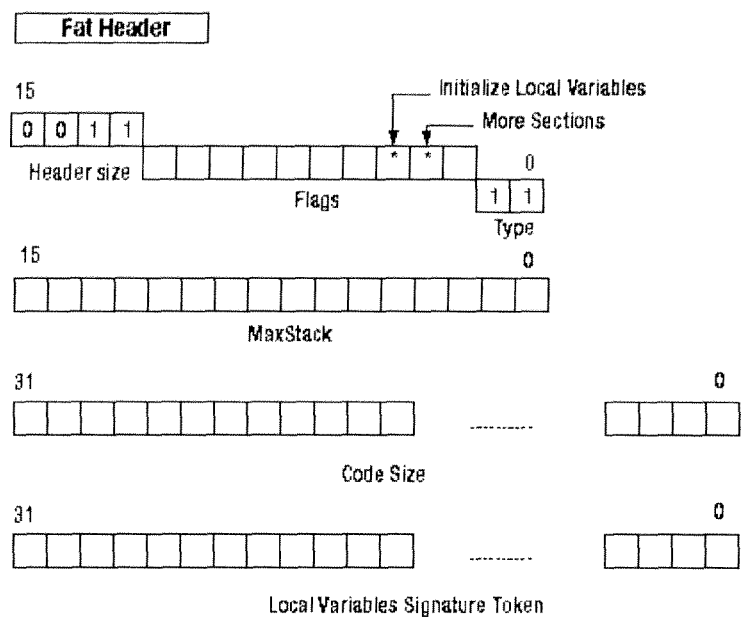
FIG. 11 is a structural diagram of a fat-header method signature in Embodiment 5 of the invention.

FIG. 11 is a structural diagram of the fat-header method signature provided in the embodiment, from which it is known that the fat-header method is comprised of 12 bytes, the first two bytes are signature, referring to the Flags item in the diagram, the following two bytes are the maximum stack size, referring to the MaxStack item in the diagram; the following 4 bytes are the code size, referring to the Code Size item in the diagram; the latest 4 bytes are serial number of the local variables signature, referring to Local Variables Signature in the diagram.

By analyzing data in the serial number of the local variables signature in the fat-header method, if the data is 0, it concludes the number of the local variables is 0; otherwise, locate the StandAloneSig item in the MetaData table according to the value, and obtain the offset of the item signature from the content in the Value item.

The Hex codes obtained by compiling the fat-header method are as follows:

1B 30 02 00 38 00 00 00 03 00 00 11 00 14 0A 00
72 21 00 00 70 0A 00 DE 12 0B 00 06 07 6F 14 00
00 0A 28 0D 00 00 0A 0A 00 DE 00 00 DE 0F 00 06
72 3F 00 00 70 28 0D 00 00 0A 0A 00 DC 00 06 0C
2B 00 08 2A

Step 5063, analyze the fat-header method signature to obtain the structured exception count and exception information, and compress the exception information.

The Flags item in the fat-header method signature occupies two bytes, corresponding to the above codes 301 B, 0x301B=(0011 0000 0001 1011) 2, if the fourth bit of the item is 0, it determines that there is no structured exception in the fat-header method, the structured exception count is 0, go to step 507; otherwise, if 1, it determines that there are more sections in the method behind the IL sections, that is structured exception handling table, execute steps as follows.

Step a, analyze the fat-header method signature to obtain the structure exception handling table; which is comprised of more sections and each stores at least one piece of exception information.

Analyze the fourth bit of the first bytes in the Flags item of the fat-header method obtained in step 505, if it is 1, it determines there are more sections in the method, and analyze the fifth and sixth bytes in the Flags item to obtain the codes size, and locate the structured exception table according to the obtained byte length of the method header and the codes size;

The byte length of the method header is prescribed, 12 bytes in the fat-header method, while fixed in the tiny-header method.

There is at least one section in one method, if there are more sections, they will be stored in one storage space subsequently and each stores at least one structure exception.

Step b, locate the content in each section according to the offset of the storage space where the sections are stored, analyze the first bytes of the content, if the seventh bit of it is 1, it determines that the type of the structured exception of the fat-header method is FatFormat, go to step c; otherwise, it determines that the type of the structured exception of the fat-header method is Tiny Format, go to step d.

The locating in details is locating the content in one section according to the position where the section is stored in the structured exception table and analyzing the first byte of the content.

Step c, locate the content in the section according to the offset of the storage space where the sections are stores, analyze the 2-5 bytes of the stored content, which refer to the size of the storage space taken by all structured exception in one section, and if the eighth bit in the second byte is 1, it means that there are other sections following the section, if there are other sections, repeat the following steps till all segments are compressed; otherwise, after performing the following steps, combine the compressed structure of the structured exception, and go to step 5064.

The compressing each section includes steps that, if the structured exception in the section is in a fat format, size of the storage space occupied by the structured exception in the section refers to a first length, preferably n×24+4 (n refers to the number of the structured exceptions), read the Flags item of 4 bytes, TryOffset item of 4 bytes, TryLength item of 4 bytes, HandlerOffset item of 4 bytes, HandlerLength item of 4 bytes, ClassToken of 4 bytes in the method body section; discard the HandlerLength item, compress values in the TryOffset item, TryLength item and HandlerOffset item respectively from 4 bytes to 2 bytes viz, discard the high bits and remain the lower hits; compress the ClassToken item from 4 bytes to 1 byte, viz, discard the high bits and remain the low 8 hits; obtain the corresponding parameter type information from the TypeDef and TypeRef table according to the ClassToken item obtained in the above step.

Table 3 is a combined structured exception table.

TABLE 3

| Exception type | Try offset | Try length | Handler offset |
| --- | --- | --- | --- |

TABLE 3-continued

Specifically, orders for all items in the table are changed as required.

Step d, analyze data in the offset obtained in step b, the second byte of the data refers to the size of the storage space taken by all structured exception in one section, if the eighth bit of the second byte is 1, it means that there are other sections following the section, if there are other sections, repeat the following steps till all sections are compressed; otherwise, after executing the below steps, go to step 5064.

The compressing each segment includes steps of determining that the structured exception in the current section is in a TinyFormat according to the type of the structured exception in one segment, and the size of the storage space occupied by the structured exception in the current section refers to a second length, preferably n*12+4, reading the Flags item of 2 bytes, TryOffset item of 2 bytes, TryLength item of 2 bytes, HandlerOffset item of two bytes, HandlerLength item of two bytes and ClassToken item of the method, and deleting the HandlerLength item from the above read items. The structured exception is obtained in the TypeDef and TypeRef table according to the obtained ClassToken item in the above steps.

Step 5064, obtain the Finally count;

After the number of the structured exceptions in the current section is obtained by the formula n*24+4 obtained by the above step c, for a structured exception whether in fat format or in tiny format, a structure is followed as below 0 2 flag, including data as follows 2 2 TryOffset, offset in bytes of try block from start of the method body 4 1 TryLength try, length in bytes of the try block 5 2 HandlerOffset, location of the handler for this try block 7 1 HandlerLength, size of the Handler code in bytes 8 4 ClassToken, Meta data token for a type-based exception handler 8 5 FilterOffset, offset in method body for filter-based exception handler The flag can be read from the structure, in which the fat format is shown in 4 bytes, the tiny format 2 bytes, with possible values as shown in table 4:

TABLE 4

| Flag | Value | Description |
| --- | --- | --- |
| COR_ILEXCEPTION_CLAUSE_EXCEPTION | 0x0000 | A typed exception clause |
| COR_ILEXCEPTION_CLAUSE_FILTER | 0x0001 | An exception filter and handler clause |
| COR_ILEXCEPTION_CLAUSE_FINALLY | 0x0002 | A finally clause |
| COR_ILEXCEPTION_CLAUSE_FAULT | 0x0004 | Fault clause (finally that is called on exception only) |

If the flag of the current structured exception is an exception filter and handler clause or finally clause, add 1 to the Finally count till completing analyzing all structured exceptions, and thus obtain the Finally count.

Step 5065, obtain the garbage collection control attribute, including steps as follows.

Step a, analyze the CustomAttribute table in MetaData tables, if the Parent item in some line of the CustomAtrribute table is related to the current analyzing method which includes method header and relating parameters, analyze the value in the Type item to obtain the type, class name and the relative constructing method etc., and locate a data block according to the value in the Value item which is an offset of the data block in the the Blob stream, analyze the first byte of the data block to obtain the size of the data block, and obtain parameters of the constructing function of self-defined attribute type by jumping Prolog of two bytes.

Step b, if the type of the self-defined attribute in the type obtained in step a is Transaction, flag the attribute flag as 0x40, viz. set the seventh bit to be 1.

Step c, if the type obtained in step a, discloses that type of CustomAttribute is GCControl, set the value in GCControl according to the value in the constructing function of definition type obtained in step a.

Force=1,
Skip=2,
OnLowMemory=3.

Step 5066, construct the compressed fat-header method table with the structure as shown in table 5 according to the above obtained value;

TABLE 5

| Garbage Collection Flag (GCF) | Stack Size | Finally Count | Structured Exception Count | Exception |
|---|---|---|---|---|

Specifically, the GCF refers to the GCC flag, there is no order for all items in table 5.

Step 507, compress the parameter list.

Locating the parameter line corresponding to the parameter list in the MetaData tables according to the value in the ParamList table obtained in step 502; reading the relating parameter lines, according to the number of the parameter obtained in step 502, which include the Flags item of two bytes, Sequence item and Name item; compressing the above items which specifically is discarding the Sequence item and Name item and compressing the content in Flags item into one byte; analyzing the flag of the parameter by the read value in Flags item of the parameter lines; combining the above flags with the offset of the parameter type, obtained in step 502, in the storage space of the compressing file in a format, parameter flag•offset of the parameter type.

Step 508, if the number of parameters obtained in step 502 is larger than 1, return to step 507; or else go to step 509.

Step 509, combine the data separately compressed in steps 503, 504, 506 and 507 to obtain the compression structure of the definition method in a format as in table 6.

TABLE 6

| Hash | ImplemFlag | Flag | Parameter count | Local variable count | Fat-header | Parameter |
|---|---|---|---|---|---|---|

There is no order for all items in table 6.

Specifically, the fat-header block is available only when the method is flagged a tat-header method in the Flag item, and a compression structure of the fat-header method header is shown in table 6.

The exception is obtained by the structured exception count which list all structured exceptions, with a compression structure as shown in table 7.

TABLE 7

| Exception type | Try offset | Try Length | Handler offset |
|---|---|---|---|

After the compressing he definition method, add 1 to the method count.

Step 510, if the method count is smaller than the line count in the table header obtained in step 501, return to step 502; otherwise, end all operation.

The line count of the table header obtained in step 501 refers to the number of definition methods stored in the Meta-Data tables, and therefore the method count smaller than the line count of the table header refers that there are still uncompressed definition methods.

The compressing the definition method in a .net file in the embodiment reduces the storage space of the .net file, makes it possible to run and store the .net file on a small-sized storage device, saves resources and improves the usage efficiency of the resources.

Embodiment 6

Figure 12:
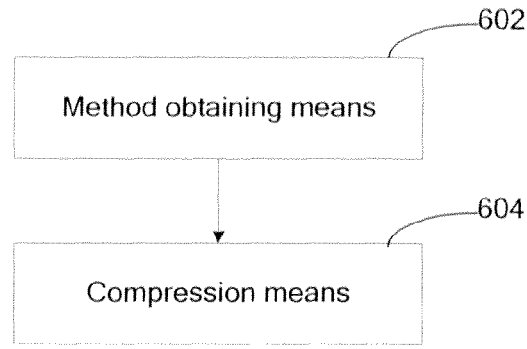
FIG. 12 is a structural diagram of a device of compressing body of definition method in a .net file provided in embodiment 6 of the invention.

A device of compressing body of definition method in a .net file, as shown in FIG. 12, includes a method obtaining means 602 for obtaining method header of the definition method in a .net file, which specifically is reading the information, in the MethodDef table, to obtain the position of the method header, such as RVA (Relative Virtual Address), and data in the method header according to the position, and reading the ILcode following the method header according to the ILcode size in the method header; and a compression means 604 for compressing the ILcode obtained by the method obtaining means 602, and method body by the compressed ILcode to obtain a compression result of the method body.

The embodiment reduces the storage space occupied by the .net file efficiently by compressing the method body of the definition method in the .net file, which makes the .net file stored and run on a small-sized storage medium, and therefore improves the function of the small-sized storage medium, such as a smart card.

Embodiment 7

Figure 13:
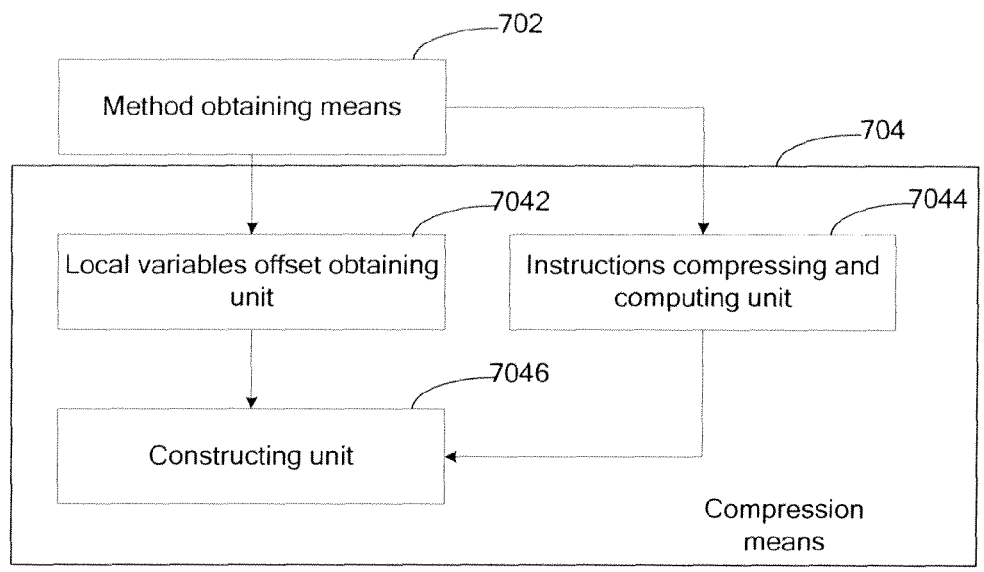
FIG. 13 is a structural diagram of a device of compressing body of definition method in a .net file provided in embodiment 7 of the invention.

A device of compressing body of definition method in a .net file is provided in the embodiment, as shown in FIG. 13, including a method obtaining means 702 and a compression means 704, of which the compression means include a local variable offset obtaining unit 7042, an instruction compressing and computing unit 7044 and a combination unit 7046.

The method obtaining means 702 is for obtaining the method header of the definition method in a .net file, and the corresponding ILcode by the method header which is obtained by the same method as that in embodiment 1 and therefore it is eliminated herein.

The compression means 704 is for compressing ILcode obtained by the method obtaining means 702, and the method body by the ILcode to obtain the compression result of the method body.

The compression means includes a local variable offset obtaining unit 7042 for obtaining local variables of the definition method by the method header obtained by the method obtaining means 702, and obtaining the offset of the local variable (refers to the offset of the local variable in the compression structure of the .net tile), by the local variable type.

If the definition method is a tiny-header method, there are not local variables in the definition method, and therefore the obtained local variables and their offset are vacant; if the definition method is a fat-header method, there are local variables in the definition method, obtain the local variables and their offset in the compression structure.

Determining whether the definition method is a tiny-header method or not includes steps of reading the first byte of the above method header, and determining whether the definition method is a fat-header or a tiny-header method by the first byte, if the lower 2 bits of it is 10, the definition method is a tiny-header method; if not, the definition method is a fat-header method.

The first byte of the method header after a reading of it, if the lower two bits of the first byte are 10, the definition method is a tiny-header method; otherwise, it is a fat-header method.

The compression means further comprises an instruction compressing and computing unit 7044 for compressing the ILcode obtained by method obtaining means 702, computing the size of the compressed ILcode.

The ILcode in the embodiment includes instructions and parameters which can he vacant, or a token pointing to the offset of the local variables in e method body, or a jump offset; when the ILcode is compressed, different compression methods can he taken by the ILcode. For example, for the ILcode with instructions having no parameters, the instructions can be recorded; for the ILcode with instructions having parameters, the compression can be implemented by the following three methods.

Firstly, if the parameter is a jump offset, viz, the instruction is a jump instruction, obtain the jumped ILcode according to the jump offset, re-compute the offset jumped by the instruction according to the jumped ILcode, and record the instruction and the re-computed jump offset. For example, there are 10 instructions in the ILcode, and the third of them is a jump instruction with a parameter 2 (refers to a two-byte jump afterward), if the fifth instruction is obtained after a two-byte jump, the jumped ILcode will be the fourth instruction and parameter thereof;

and the compression method is compressing the jumped ILcode, changing the parameter of the third instruction according to size of the compressed jumped ILcode.

The compression method does not change the meaning of the original ILcode after compressing all instructions and parameters.

Secondly, if the parameter refers to the offset of the local variables in the method body, the compression method is recording the instruction and parameter thereof.

Thirdly, if the parameter is a token, the compression method is obtaining the offset of the token in the compression structure, and recording the instructions and the obtained offset.

In sum, the recorded content is the compression result of the ILcode.

The compression means further comprises a combination unit 7046 for combining size of the compressed ILcode computed by the instruction compressing and computing unit 7044, the local variables offset obtained by the local variables offset obtaining unit 7042, with the ILcode compressed by the instruction compressing and computing unit 7044, to obtain the compression result of the method body.

Particularly, the prescribed format is arranging the size of the compressed ILcode, the local variables offset, and the compressed ILcode in order or randomly.

The compression structure of the .net file referred to in the embodiment means all data in the .net file is arranged in order and offset of each line corresponds to the line token; for example, the offset of the line ranking first in Namespace is 0, corresponding to the token 0; and that of the line ranking second in Namespace is 1, corresponding to the token 1, and the compression structure can be so obtained.

Particularly, the data (type, method and field) is divided into two types, reference type and definition type, of which the referenced data is arranged before the defined data in the compression structure, and so the order of the tokens of the two types; the offset corresponds to the token, which takes 1 byte in length, for example, there have been six reference types which are arranged at the offsets from 0 to 5, as a result the token of the first definition type is 6, so is its offset.

For example, source codes of the .net file are as follows.

```
public String MySampleMethod( )
{
        String strHello = "Hello World !";
        if (strHello != null)
            strHello += "Y";
        return strHello + callCount.ToString( );
}
```

The converted compression structure is as follows:
Namespace:

(0) 0100 5E5F8700
(1) 0100 35F47B00
(2) 0100 A17EC300
(3) 0700 00F64D00
(A) 0200 ACE6EB00
TypeRef:

(0) F5513 0100 0000
(1) D9F8 0100 0000
(2) CB0F 0100 0000
(3) 81CE 0000 0000
(4) 2711 0100 0000
(5) 2722 0000 0000
(6) 4970 0100 0000
(7) C061 0100 0000
(8) A1FA 0100 0000
(9) 3064 0100 0000
MethodRef:

(0) E8CB
(1) CE72
(2) 9080
(3) 3973
(4) 9080
(5) 6A4D
(6) 6AF2
(7) 9080
FieldRef:

Blob:

(0) 0D00
(1) 0100
(2) 0D00
TypeDef:

(A) A70914 0009000200
MethodDef:

(8) DFEE000600040704
(9) 9080020600000703

Of the above data, what is in the first parentheses of each line refers to the offset of the line, following it is the content in the line. Specifically, of the Namespace, each line records one piece of Namespace information, for example, the first line records (0) 0100 D93 DEB00, of which 0 in the parentheses refers to the offset of Namespace which is not existent in reality and 0100 D93DEB00 refers to the Namespace information; and other lines have the same structure as that of the line.

The above data is only part of the compression structure of the .net file, only for describing the relation between the token in the .net file and the offset in the compression structure.

By compressing the ILcode and computing the size of the compressed ILcode by the instruction compressing and computing unit 7044, combining the compressed ILcode by the combination unit 7046, taking the size of the compressed ILcode and the offset of the local variables as the compression result of the method body, the embodiment reduces the storage space occupied by the .net file efficiently, which makes the .net file stored and run on a small-sized storage medium, and further improves the function of small-sized storage medium, such as a smart card.

Embodiment 8

Figure 14:
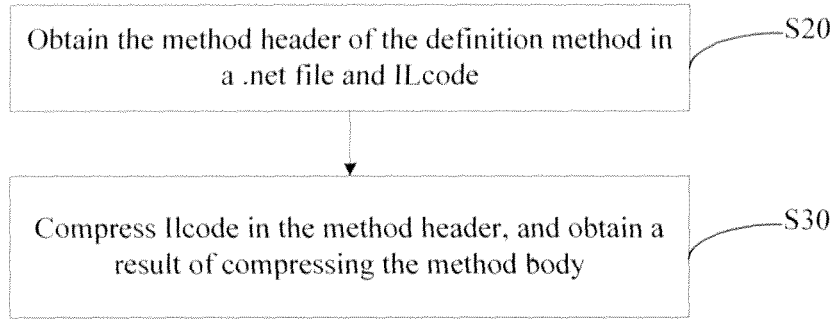
FIG. 14 is a flow chart of a method for compressing body of definition method in a .net file provided in embodiment 8 of the invention.

A method for compressing body of definition method in a .net file is provided in the embodiment, which is executed by the compression device referred to in embodiment 6, as shown in FIG. 14, including steps as follows.

Step S20, obtain the header of the definition method from a .net tile, and the ILcode of the definition method by the method header;

Step S30, compress the ILcode in the method, compresses the method body by compressing the ILcode to obtain a compression result of the method body.

By compressing the method body in the definition method of the .net file, the embodiment reduces the storage space occupied by the .net file, makes it stored and run on a small-sized storage medium, such as a smart card, and therefore improves function of a small-sized storage medium.

Embodiment 9

Figure 15:
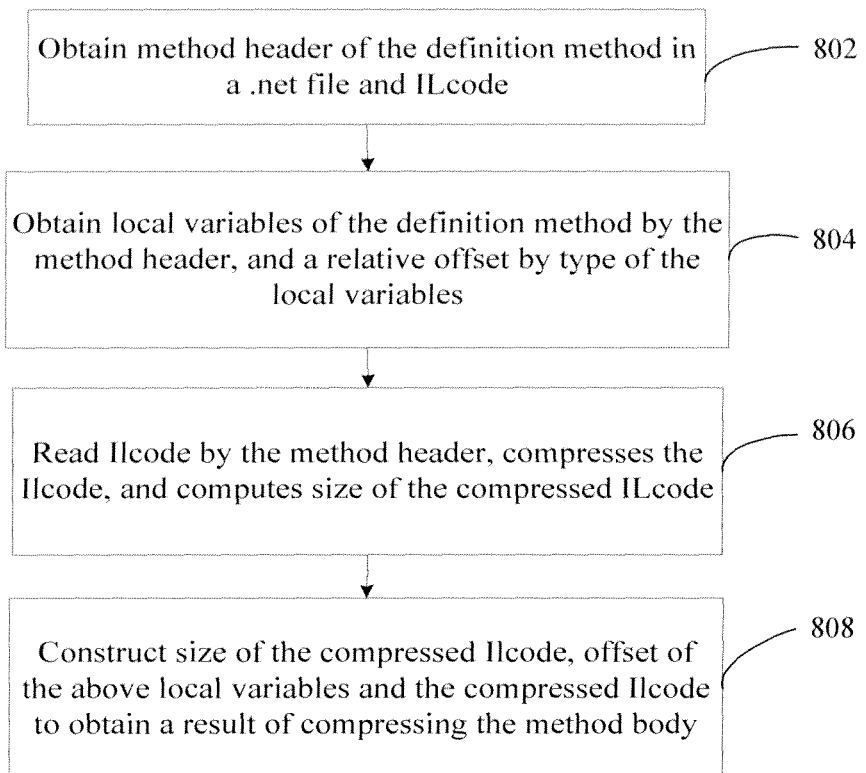
FIG. 15 is a flow chart of a method for compressing body of definition method in a .net file provided in embodiment 9 of the invention.

A method for compressing body of definition method in a .net file is provided in the embodiment, as shown in FIG. 15, including steps as follows.

Step 802, obtain the method header of the definition method in a .net file, and ILcode of the definition method by the method header.

The .net file compiled by the .net platform includes Namespace, TypeRef, TypeDef, MethodDef and string etc, which are stored in forms of tables and streams, and therefore, before compressing the ILcode in the .net file, the .net file structure can he converted into a compression structure. The compression structure is the same with that referred to in embodiment 6, thus details of it are eliminated herein.

IL includes instruction and parameter thereof which can be vacant or a token pointing to the offset of local variables or a Jump offset. And the first half of the token refers to the table corresponding to the instruction, and the second to some line of the table.

Specifically, obtaining the method header can include steps of obtaining the MethodDef table from the .net file, and reading address of the definition method in the .net file from it, and obtaining the method header of the definition method by the address.

Reading ILcode by the method header includes steps of obtaining size of the ILcode by the information in the method header, and by which reading the ILcode. For a fat-header method, the 5 to 8 bytes of the method header refer to size of the IL corresponding to the method, 9-12 bytes to the token of local variables in the method while for a tiny header method, the higher 6 bytes in the method header refer to size of the ILcode.

Step 804, obtain a local variable of the definition method by the method header, and offset of the local variable (refers to the offset of the local variable in the compression structure of the .net file) by type of it.

Because there are not local variables in a tiny-header method, the obtained local variable is vacant, and so is the offset of it; specifically, steps of determining whether the definition method is a fat-header or a tiny-header method are the same with those in embodiment 6, and so are eliminated herein.

Step 806, compress the read ILcode, and computes size of the compressed ILcode.

When compressing the ILcode, the method of it can be selected by the ILcode, and details of the method are the same with that in embodiment 7 and so are eliminated herein.

Particularly, after reading and compressing an instruction, a further step is included of determining whether all instructions and parameters in the ILcode have been read and compressed, if yes, compute size of the compressed ILcode; if not, read and compress the following instruction.

Step 808, combine size of the compressed ILcode, offset of the above local variables, with the compressed ILcode according to a prescribed format to obtain a compression result of the ILcode.

Specifically, the prescribed format is arranging the size of the compressed ILcode, offset of the local variables, and compressed ILcode in order or randomly.

The compression method further includes steps of determining whether method headers of all definition methods in the .net file have been read and all ILcodes have been compressed, if yes, read the next method header and execute steps 802 to 808; if not, end the compression.

By compressing and computing size of the compressed ILcode, combining the compressed ILcode and size of it with the offset of the local variables as a compression result of the method body, the embodiment reduces the storage space occupied by the .net file, makes it stored and run on a small-sized medium, such as a smart card, and therefore improves the function of the small-sized medium, such as a smart card.

Embodiment 10

Figure 16:
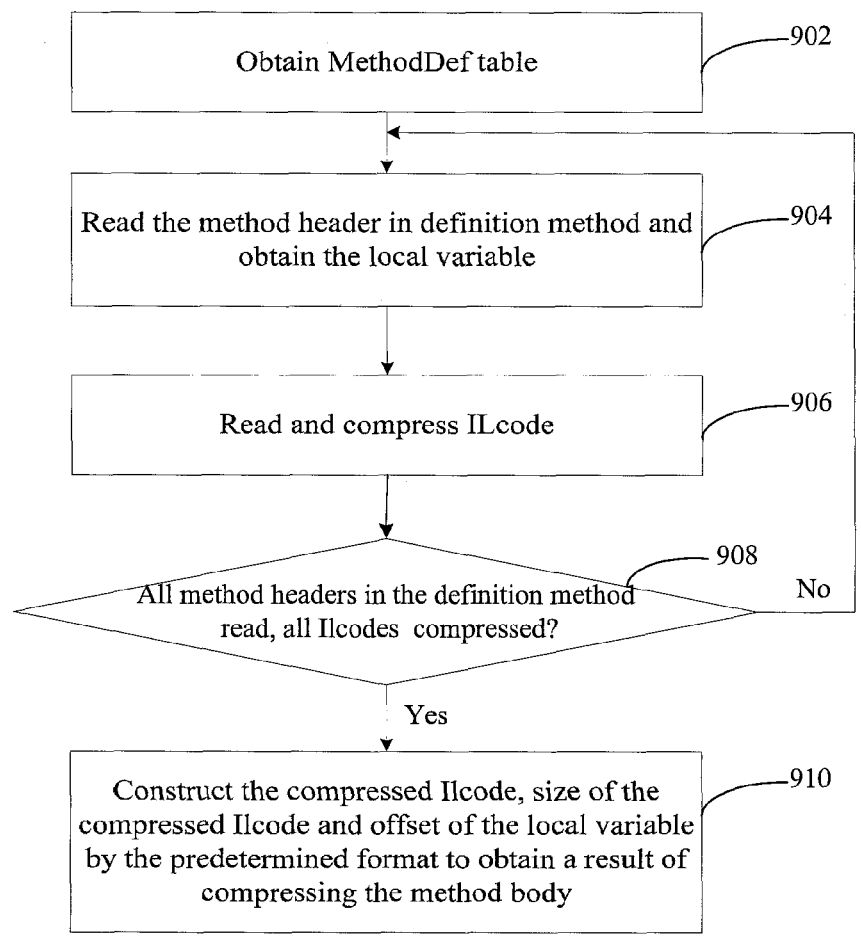
FIG. 16 is a flow chart of a method for compressing body of definition method in a .net file provided in embodiment 10 of the invention.

A method for compressing body of definition method in a .net file is provided in the embodiment, as shown in FIG. 16, including steps as follows.

Step 902, obtain the MethodDef table.

There are more tables in a .net file, of which the MethodDef table records addresses of method headers of all definition methods in the .net tile, specifically in the embodiment, the obtaining step is obtaining the MethodDef table from a compiled .net

```
public String MySampleMethod( )
    {
            String strHello = "Hello World !";
            if (strHello != null)
                strHello += "Y";
            return strHello + callCount.ToString( );
```

}

Figure 17:
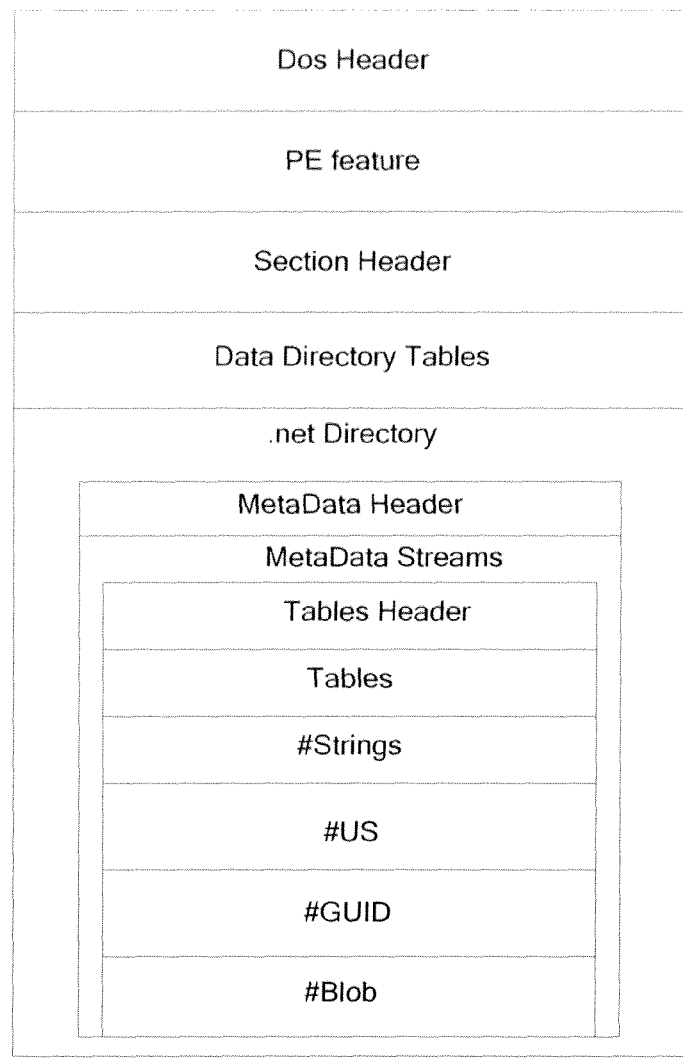
FIG. 17 is a structural diagram of .net file provided in embodiment 10.

A hellowworld.exe file is obtained after the above codes are compiled by a .net platform and then stored in a binary format on a hardware, the file in binary format refers to the .net file, as shown in FIG. 17 of a structural diagram of the .net file, including a Dos header, PE feature or MetaData (including MetaData Header and tables) etc.

Reading the MethodDef table includes steps as follows.

Step a, locate the Dos header of the .net file, 0x5a4d.

Step b, jump a first prescribed number of bytes (0x003a bytes) from the Dos header and read the offset of PE feature, 0x00000080.

Step c, locate the PE feature 0x4550 by the offset of PE feature 0x00000080.

Step d, read four bytes after moving a second prescribed number of bytes from the PE feature.

Specifically, for a 32-bit machine, the second prescribed number of bytes are 0x0074 bytes after the PE feature, the four bytes read are 0x00000010 which discloses that there are 0x10 directories and .net data; and more the relative virtual address of the MetaData header in the .net file is recorded in the 0x0F directory; while for a 64-bit machine, the second prescribed number of bytes are 0x0084 bytes.

Step e, read data of 8 bytes after moving a third prescribed number of bytes from 0x00000010.

Specifically, the third prescribed number of bytes are 112 bytes, and of the read 8 bytes, the first four 0x00002008 refer to the relative virtual address of the .net header; and the second four 0x00000048 to the size of the .net header;

Step f, obtain the linear address 0x00000048 by the relative virtual address of the .net header, and the following data by the .net header.

480000000020005008C210000A0090000
090000000500000600000000000000005
020000080000000000000000000000000
000000000000000000000000000000000
0000000000000

Particularly, the above data is stored in a tiny-endian format, e.g. the first four bytes of the data 0x48000000 refer to size of it, which is 0x0000048 when stored in a big-endian format.

In the embodiment, the linear address refers to address of the .net data in the .net file, the relative virtual address refers to the offset of it from the PE loading point in the memory, and the linear address can be obtained by a formula of relative virtual address−relative address of section+offset of section; specifically, the relative virtual address of the section of the .net data directory in the met file is 0x00002000, the offset of the section is 0x00000200, the linear address will be 0x00000208 by 0x00002008−0x00002000+0x00000200.

Step g, read 8 bytes from the position after an offset of fourth prescribed number of bytes (8 bytes) from the .net data header, of which the first four bytes 0x0000218c are the relative virtual address of the MetaData Header and the following four 0x000009a0 are size of the MetaData.

Step h, convert the relative virtual address of the MetaData Header 0x0000218c to a linear address 0x0000038c, and obtain what is in MetaData by the linear address and size of the MetaData.

Step i, keep reading from start of MetaData Header, when reaching the symbol #~, read the first eight bytes before the symbol #~, of which the first four refer to the address of the #~ stream and by the address the #~ stream can be obtained, and read data of 8 bytes from start of a fifth prescribed number of bytes in the #~ stream to obtain 0x0000000920021c57 which is 1001001000000000001000011100070101111 in binary format.

Specifically, the fifth prescribed number of bytes refers to the ninth byte from the beginning address of the #~ Stream.

Step j, read data from the lower bit of the binary data obtained in step i.

Specifically, the first bit refers to whether there is Module table, and the value 1 of it refers to yes while 0 refers to no; particularly there is Module table in the embodiment, the value 1 of the second bit refers to that there is TypeRef table; and so the value 1 of the seventh bit refers to that there is MethodDef table.

In sum, of the data obtained in step i, each bit (from the lower bit beginning) refers to whether there is a relative table in the .net file;

Step k, read the number of lines in the MethodDef table after an offset of a sixth prescribed number of bytes (specifically 24 bytes), from 0x0000000920021c57, and the reading step is reading 4 bytes after an offset of 24 bytes from 0x0000000920021c57 to obtain 0x00000002 which discloses that there are 3 lines in MethodDef table.

In the MetaData, every four bytes record the number of lines of all tables available in the .net file after an offset of 8 bytes from 0x0000000900021057, following the data for disclosing the number of lines is content in each table, which refers to the Tables section. Specifically in the embodiment, there are four tables before the MethodDef table, and therefore the number of lines in the MethodDef table is read after an offset of 24 bytes (obtained by 8+4×4) from 0x0000000900021057, according to the method for computing the sixth prescribed number of bytes.

Step 1, read what is in the MethodDef table according to a prescribed method as follows.

Particularly from the .net file, it is known that there are 28 lines in the five tables before the MethodDef table, one line for the Module table, 23 lines for the TypeRef table, 3 lines for the TypeDef table and one line for the Field table. There are total 10 bytes in each line of the Module table, 6 bytes in that of the TypeRef table, 14 bytes in that of the TypeDef table and 6 bytes in that of the Field table, and therefore the offset of the MethodDef table in the Tables section is 196 bytes by 10×1+23×6+3×14+6×1, and because there are two lines in the MethodDef table with each line occupying 14 bytes, the size of the MethodDef table is 28 bytes by 2×14.

Data in the MethodDef table is listed as below:
0C210000 0000 8600 8900 3000 0100
47210000 0000 8618 8300 2C00 0100

Of which each line provides definition method-related information, and the first fourth bytes of it refer to the relative virtual address RVA of the method header of the definition method, for convenience of description, take the above data in a table, table8.

TABLE 8

| RVA | ImplFlags | Flags | Name | Signature | ParamList |
|---|---|---|---|---|---|
| 0000210C | 0000 | 0086 | 0089 | 0030 | 0001 |
| 00002147 | 0000 | 1886 | 0083 | 002C | 0001 |

The data in table 8 is in big-endian format, i.e. the first line of data is 0C210000 0000 8600 8900 3000 0100, which refers to 0000210C 0000 0086 0089 0030 0001 in tiny-endian format.

Step 904, read the method header of the definition method, and obtain the local variables by what is in the method header.

Figure 18:
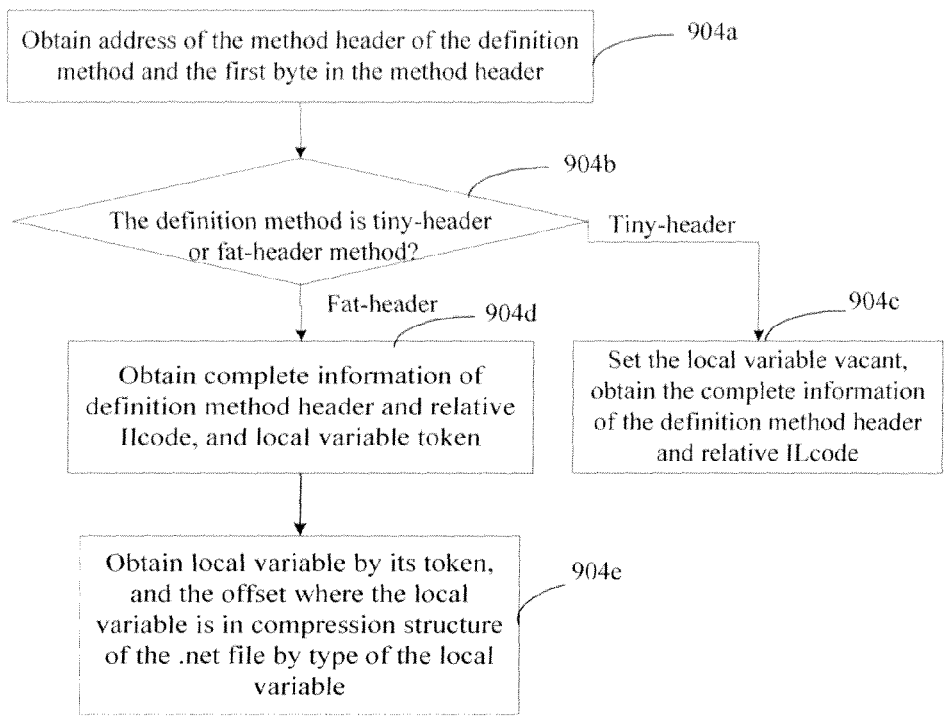
FIG. 18 is a flow chart of obtaining the method header provided in embodiment 10.
Figure 19:
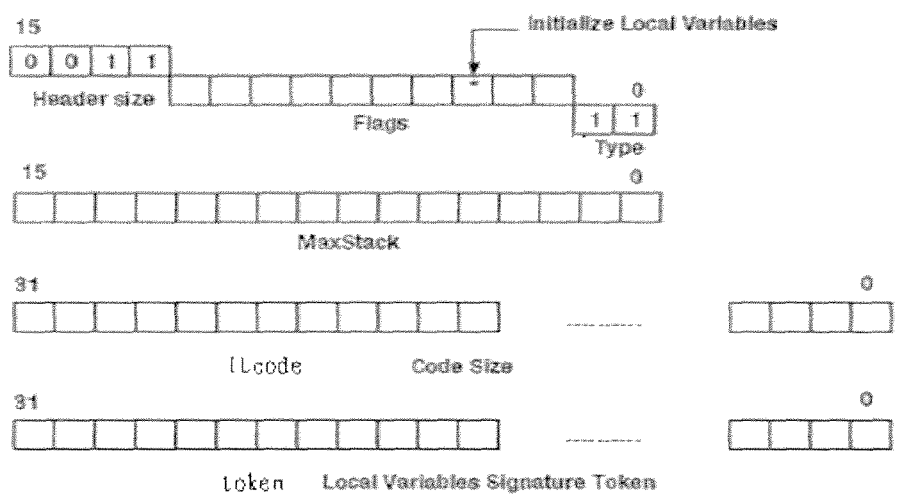
FIG. 19 is a diagram of data format of the fat-header method provided in embodiment 10.

Particularly for the first definition method in the MethodDef table, the obtaining the method header of the definition method, as shown in FIG. 18, includes steps as follows.

Step 904a, obtain the method header address of the definition method and read the first byte of the method header.

Specifically Step 904a includes steps of obtaining data from the MethodDef table obtained by the step 902, and the relative virtual address (RVA) of the method header of the first definition method 0x0000210C, and the linear address 0x0000030C by the RVA, reading data of one byte in length, 0x13 from the .net file according to the address 0x0000030C.

Step 904b, determine whether the definition method is a fat-header or a tiny-header method, if it is a fat-header method, go to step 904d; otherwise, go to step 904c.

Specifically, the determining step is same with that in embodiments 6 and 7, and so is eliminated herein.

For example, 0x13 obtained in step 904a corresponds to 00010011 in a binary format, of which the lower two bits 11 refer to a fat-header method.

Step 904c, because there are not local variables in the tiny-header method, set the local variables vacant, and obtain complete method header information and corresponding ILcode;

Step 904d, obtain the complete method header information, corresponding ILcode, and local variables token. The data format for the hit-header method is as shown in FIG. 8. From FIG. 8, it is known that the fat-header method is comprised of 12 bytes, of which the first two are flags, referring to the Flags item; the following four are size of the method-related ILcode, referring to the Code Size item; the latest four are local variable token, referring to the Local Variables Signature Token item. If the value in the Local Variables Signature Token item in the fat-header flag is 0, it means that number of the local variables is 0; otherwise, if not 0, the StandAloneSig table can be located by the value, the offset of Signature can be read by what is in the Value item, and so can the number of local variables;

From the format of the fat-header method, it is known that the 5-8 bytes of the method header refer to the ILcode size, and 9-12 bytes refer to the local variables token in big-endian format, and following the token is ILcode 0x11000002. Specifically, the ILcode corresponding to the method according to the header obtained is as follows:

133002002F00000002000011007721D0000700A190B0614FE010D092D0C067239000070281200000A0A061201281300000A281200000A0C2B00082A

Figure 20:
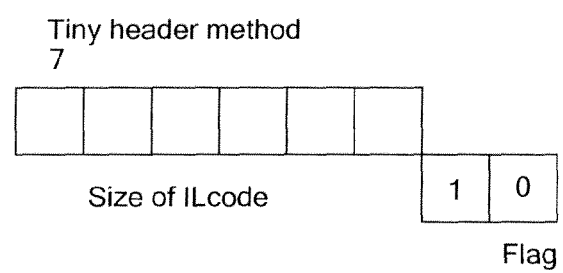
FIG. 20 is a diagram of data format of the tiny-header method provided in embodiment 10.

As shown in FIG. 20, a structural diagram of the data format of tiny-header method provided in the embodiment, it is known that the upper 6 bits of the header of the tiny-header method refer to the ILcode size, and the lower 6 bits refer to flags of the tiny-header method.

Step 904e, obtain a local variable by its token, and an offset of the local variable in the compressed structure of the .net tile by type of the local variable.

The obtaining the local variable includes steps of locating a special line of the StandAloneSig table, by the local variable token, which records an offset of the local variable of the definition method in the Blob stream, and reading the local variable by its offset.

For example, the local variable token is 0x11000002. Of it, 0x11 refers to the MetaData table with serial number 0x11 (StandAloneSig table) and 0x000002 refers to the second line of the table, and thus the local variable of the definition method corresponds to the second-line of the StandAloneSig table. Data in the second-line is 0x0100, referring to the offset of the local variable in the Blob stream; and by the offset the local variable 0x0607040E080E02 is obtained, of which 0x06 refers to size of the local variable information, 0x07 to the local variable token, 0x04 to size of the local variable, and 0x0E to the local variable type String (a reference type).

According to the compression structure of the .net file, specifically for the offset of String in the TypeRef table 0x04, the compression program replaces the local variable for storing the definition method in the .net file with 0x04; for the same reason, 08 discloses that the local variable refers to the reference type (Int), corresponding to the offset 0x07 in the compressed structure of the .net file; 02 discloses the local variable refers to the reference type (Boolean), corresponding to the offset 0x05 in the compressed structure of the .net file; and the two 0x0E in the definition method show two local variables of String type available in the definition method.

The method for locating the Blob stream includes steps as follows.

After obtaining the address 0x0000038c of the header in step h of Step 902, the compression program moves from the MetaData header, when reaching the symbol #Blob, reads 8 bytes 0x2006000098010000 before the symbol #Blob, of which the higher 4 bytes (0x00000620 in big-endian format) are offset of the Blob stream in the header and the lower 4 bytes (0x00000198 in big-endian format) are size of the Blob stream, moves 0x00000620 to obtain the data section of the Blob stream by the address 0x0000038c of the header.

Step 906, read and compress the ILcode;

Specifically, the header and ILcode obtained in step 904d are
133002002F00000002000011007721D0000700A190B0614FE010D092D0C067239000070281200000A0A061201281300000A281200000A0C2B00082A.

What is following the local variables token 0x11000002 is ILcode, the 5-8 bytes of them 0x0000002F refer to the size of ILcode, and the obtained ILcode are 00721D0000700A190B0614F E010D092D0006723900007028120 0000A0A061201281300000A281200000A0C2B00082A.

The ILcode in the .net file includes one or more instructions and parameters in two forms of combination, instruction+parameter or instruction. The parameter includes an operation object token, offset or offset of the local variable in the ILcode. Commonly, the parameter following the Jump instruction is an offset. The offset of the local variable in the ILcode is a serial number of it in all local variables in the definition method.

Figure 21:
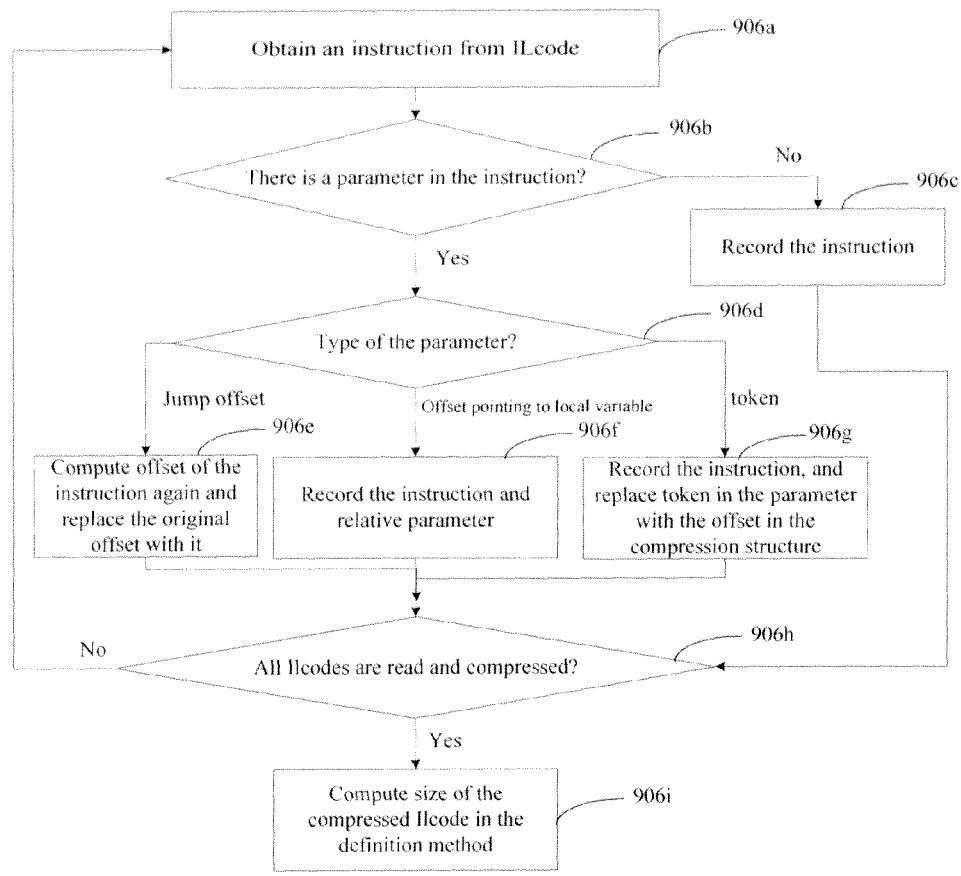
FIG. 21 is a flow chart of a method for compressing IL code provided in embodiment 10.

A method for compressing the above ILcode, as shown in FIG. 21, a flow chart thereof, includes steps as follows.

Step 906a, obtain an instruction from the ILcode.

Step 906b, determine whether there is a parameter following the instruction, if no, go to step 906c; if yes, go to step 906d.

Step 906c, record the instruction and go to step 906h.

Step 906d, determine type of the parameter following the instruction, if it is a jump offset, go to step 906e, if it is an offset of the local variable in the subjected method, go to step 906f; if it is an token, go to step 906g.

Step 906e, re-compute an offset of the instruction and replace the computed offset with the original offset, go to step 906h.

Specifically, the parameter following the jump instruction is a jump offset. Because the compression of the ILcode results in a change of order in data, it is a must to compute the offset and replace it with the original offset. For example, there is a jump operation 0x2B00, in the ILcode provided in the embodiment, of which 0x2B refers to the jump instruction and 0x00 to the offset.

There is another jump operation 0x2D0C in the embodiment, of which 0x2D refers to the jump instruction, and 0x0C refers to the jump offset of 12 bytes from 0x0C, such as 0x0C067239000070281200000A0A. By compressing the jumped ILcode, 0x0C067239000070281200000A0A is compressed to be 06720128030A of 6 bytes, and then the offset following the instruction 0x2D should be modified as 0x06, and thus the ILcode: 0x2D0C is compressed to be 0x2D06.

Step 906f, record the instruction and corresponding parameter, go to step 906h.

Specifically, the instruction 0x0a, 0x0b, 0x0c and 0x0d is also an instruction pointing to the local variables and disclosing an offset of the local variables, of which 0x0a points to the first local variable of the method it belongs to, 0x0b points to the second local variable of the method it belongs to, 0x0c the third local variable of the method it belongs to, 0x0d the fourth local variable of the method it belongs to, and therefore there are parameters following the above instruction; go to step 906c.

If the number of the local variables in the definition method is larger than 4, record the original instruction and relative parameter. Specifically of the ILcode: 0x1704, the instruction 0x11 points to the fifth local variable in the method, so the compression program records the such-like ILcode directly.

Particularly in steps 906d and 906f, the offset of the local variable in the local variables is the serial number of the current local variable in all local variables in its subjected definition method.

Step 906g, record the instruction, replace token in the parameter with the offset in the compressed structure, and go to step 906h.

Specifically, the step includes steps of replacing the token pointing to special data in the parameter with the offset. In the .net tile, the token occupies four bytes, of which the higher one byte records a MetaData table pointed to and the lower three bytes disclose a special line pointed to in the Metadata table. For example, the ILcode in the embodiment refers to 0x72 1D00007 in a big-endian format, of which 0x72 refers to instruction and 0x1D00007 to the token of the data pointed to. It is known by analyzing 0x72 1D00007 that the higher one byte 0x1D refers to the serial number of the table, pointing to the FieldRVA table, and 0x000007 refers to the line number 7, and therefore the ILcode points to the data in the seventh line of the FieldRVA table in the .net file, and correspondingly, the offset of the seventh line is obtained according to the compression structure of the .net file, such as 0x02, and the original ILcode, 72 1D00007 can be replaced with 0x72 02.

Step 906h, determine whether all instructions and parameters of the ILcode in the definition method have been read and compressed, if yes, go to step 906i; if not, go to step 906a.

In the .net file, the method header records size of the ILcode, such as 0x0000002F. If the ILcode of the size is read, it is deemed that all instructions and parameters in the ILcode of the method have been read and compressed.

Step 906i, compute the size of the compressed ILcode in the definition method.

Specifically, data obtained by the compressed ILcode in the definition method is as follows:

[00][72](02)[0A][19][0B][06][14][FE01][0D][09][2D] [06][06][72](01)[28](03)[0A][06][12][01][28](05)[28](03) [0C][2B][00][08][2A]

In brief, the instructions in the data are shown in square bracket, and the parameters shown in parentheses, and size of the compressed ILcode is 0x0020 by computing.

Step 908, determine whether method headers of all the definition methods have been read and all relative ILcodes have been compressed, if yes, go to step 910; if not, go back to step 904 and keep reading the method header of the next definition method.

The .net file records number of lines of the definition methods, as described in step k of step 902, that is the number of the definition methods. Specifically there are four definition methods, and thus only if all headers of the four definition methods have been read and all relative ILcodes have been compressed, it assumes that all headers have been read and all relative ILcodes have been compressed.

Step 910, obtain the compressed method body by combining the compressed ILcode, size of the ILcode, with offset of the local variables according to a prescribed format as shown in table 9.

TABLE 9

| Size of the compressed ILcode | Offset of the local varaibles | Compressed ILcode |
| --- | --- | --- |

For example, the compression result of the method body is [2000][(04)(07)(04)(05)][00][72](02)[0A][19][0B][06] [14][F E01][0D][09][2D][06][06][72](01)[28](03)[0A][06] [12][01][28](05)[28](03)[0C][2B][00][08][2A].

The above data is shown in a tiny-endian format, of which 0x2000 refers to size of the compressed ILcode, (04)(07)(04) (05) respectively identify the offsets of the four local variables in the table, and the following data refers to the compressed ILcode with the compressed instructions and parameters.

The following is a compression result of the method body of the second definition method: [0400][ ] [02][28](07)[2A]

It is just a preferred structure and therefore some changes can be taken, for example, arrange the offset of the local variables in front of the compressed ILcode, or vice versa.

By compressing the method body in the .net file, the method provided in the embodiment reduces the storage space occupied by a .net file, makes the .net file applicable in a small-sized device. Particularly, the steps as shown in the flow charts of the drawings can be executed in a group of programmable computer systems, and although the orders are given in the flow charts, they can he changed as required.

Furthermore, the above executable instructions can be stored in a storage medium n (one or more devices for storing data, including Read-Only Memory (ROM), Random Access Memory (RAM), magnetic RAM, magnetic core memory, disk storage medium, optical storage medium, flash memory and/or other machine-readable medium for storing information). The machine-readable medium includes, but not limits to, portable or fixed storage device, optical storage device, wireless channel or other medium able to storing, accommodating or loading instructions and/or data.

Embodiment 11

Figure 22:
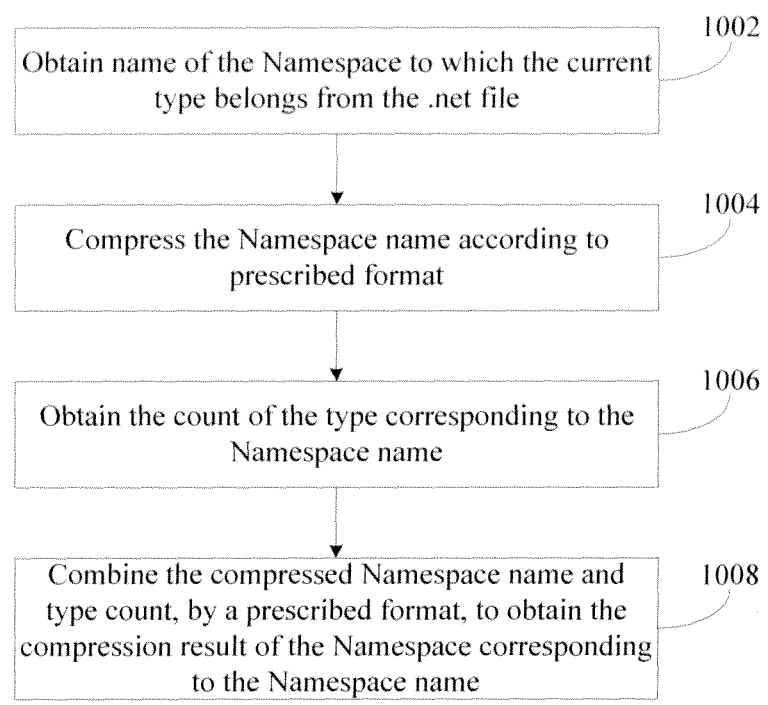
FIG. 22 is a flow chart of a method for compressing Namespace in a .net file provided in embodiment 11 of the invention.

A method for compressing Namespace in a .net file is provided in the embodiment, as shown in FIG. 22, including steps as follows.

Step 1002, obtain the name of Namespace to which the current type in the .net file belongs.

Specifically it includes steps of obtaining the table including the name offset of Namespace from the .net file and the name offset of Namespace to which the current type belongs from the table, and read the Namespace name from the "#Strings" stream according to the name offset of Namespace.

There are many tables in a .net file, of which the tables including the name offset of Namespace are the TypeDef table or Type Ref table.

Step 1004, compress name of Namespace by prescribed algorithm.

It specifically includes steps of constructing a Namespace string by the Namespace name, performing hash operation on the Namespace string to obtain a hash value, and taking prescribed bytes of the hash values as the compressed Namespace name. The hash algorithm includes MD5, SHA-1 or SHA-2 etc.

Constructing the Namespace string by the Namespace name includes a step of connecting the public key token of the .net file and the Namespace name.

Step 1006, obtain the Namespace name-related type count which refers to the number of types included in the Namespace;

The type count can be obtained by an alternative step of, if the Namespace name is obtained for the first time, setting the type count, corresponding to the Namespace name, to be 1; or if not, keeping adding 1 to the type count till the table is completely traversed.

Step 1008, combine the compressed Namespace name with the type count to obtain the compression result of the Namespace corresponding to the Namespace name.

The prescribed format can be fixed-size bytes which include two parts, the type count and the compressed Namespace name.

Specifically, after step 1002, a further step is included of determining whether the currently obtained Namespace name has been obtained, if not, going to step 1004, if yes, adding 1 to the type count of the Namespace.

Further, the method for compressing Namespace in the .net file includes a step of determining whether the names of all Namespace to which all types belongs have been read, if yes, executing step 1008; if not, reading name of the Namespace to which the next type belongs, viz. returning to step 1002.

By compressing the obtained Namespace names and combining them with corresponding type counts to obtain compressed Namespaces, the embodiment reduces the storage space occupied by the .net file efficiently, makes it run and stored in a small-volume medium such as a smart card, and therefore improves the function of the small-volume medium, such as a smart card.

Embodiment 12

A method for compressing Namespaces in a .net file is provided in the embodiment, in which the .net file refers to the file compiled by the .net platform without compressing Namespaces, and the step of compressing the Namespaces is completed by a compression program.

Figure 23:
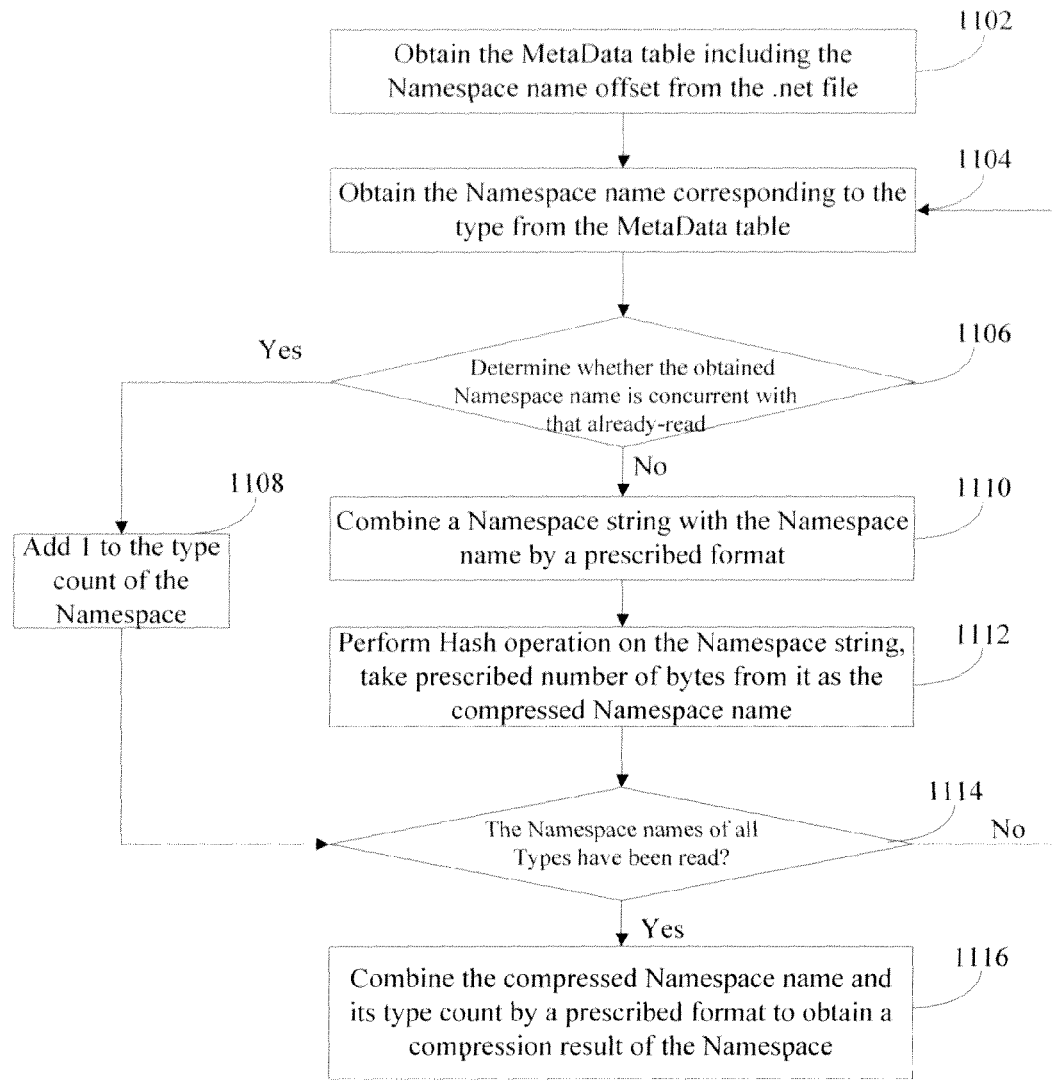
FIG. 23 is a flow chart of a method for compressing Namespace in a .net file provided in embodiment 12 of the invention.

As shown in FIG. 23, the method includes steps as follows.

Step 1102, obtain the MetaData tables including the offsets of Namespace names from the .net file;

There are many MetaData tables in the .net file, of which those including the offsets of Namespace names are TypeDef table, TypeRef table. The below introduces the typeDef table for description of obtaining the MetaData table from the .net file.

The method for obtaining the MetaData table is described with the file compiled from the below codes.

```
namespace MyCompany.MyOnCardApp
{
    public class MyService : MarshalByRefObject
    {
        static Version ver = new Version(1, 1, 1, 1);
        static Int32 callCount = 0;
        static ClassB classb = new ClassB( );
        String strResult = Boolean.FalseString;
        public String MySampleMethod( )
        {
            String strHello = "Hello World !";
            return strHello + callCount.ToString( );
        }
    }
    public class ClassB{ }
    public struct StructB{ }
}
```

Figure 24:
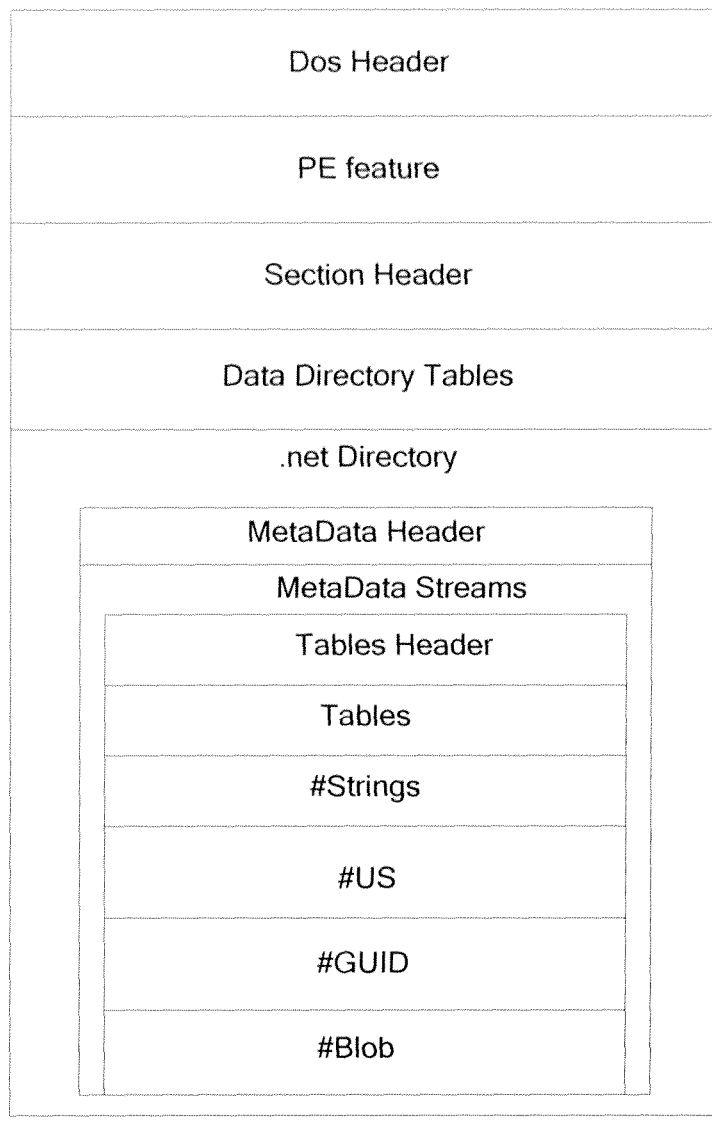
FIG. 24 is a structural diagram of a .net file structure provided in embodiment 12 of the invention.

A helloworld.exe tile is obtained by compiling the above codes on a .net platform, and stored in a binary format on a hard disk. The stored binary file is a .net file, as shown in FIG. 24, including Dos Header and PE feature etc.

The compression program obtaining a MetaData table includes steps as follows.

Step a, the compression program locates and obtains the Dos header of the .net file, 0x5a4d.

Step b, the compression program reads the offset of the PE feature, 0x00000080, by jumping a first prescribed number of bytes, specifically 0x003a bytes, from the Dos Header.

Step c, the compression program locates the PE feature 0x4550 by its offset 0x00000080.

Step d, the compression program reads four bytes after an offset of a second prescribed number of bytes.

Specifically for a 32-bit machine, the second prescribed number of bytes is 0x0074 bytes from the PE feature, and the read four bytes are 0x00000010 which discloses 0x10 directories available in the binary file and the .net data included.

The address of the MetaData header in the .net file is recorded in the 0x0F directory.

For a 64-bit machine, the second prescribed number of bytes is 0x0084 bytes.

Step e, the compression program reads 8 bytes attar an offset of a third prescribed number of bytes, specifically 112 bytes, from 0x00000010. Of the read 8 bytes, the first four bytes 0x00002008 refer to the relative virtual address of the .net MetaData header and the following four 0x00000048 to the size of the .net MetaData header.

Step f, the compression program obtains the linear address 0x00000208 by the relative virtual address in the .net MetaData header, and obtains the following data by reading the header:

48000000020005008C210000A0090000
09000000050000060000000000000005
02000008000000000000000000000000
00000000000000000000000000000000
0000000000000

Particularly, the above data is stored in a little-endian format, for example the first 4 bytes of it 0x48000000 refer to the size of the data, which is 0x0000048 in a big-endian format.

In the embodiment, the linear address refers to the address of the .net data in the .net file, the relative virtual address refers to the offset of it from the PE loading point in the memory, and the linear address can be obtained by a formula of the relative virtual address−the relative address of section+ the offset of section; specifically, the relative virtual address of the section of the .net data directory in the .net file is 0x00002000, the offset of the section is 0x00000200, the linear address will be 0x00000208 by 0x00002008−0x00002000+0x00000200.

Step g, the compression program reads 8 bytes after an offset of a fourth prescribed number of bytes, specifically 8 bytes, from the .net MetaData header, of which the first four bytes 0x0000218c refers to the relative virtual address of MetaData header and the following four bytes 0x000009a0 refers to the size of the MetaData header.

Step h, the compression program obtains the linear address 0x0000038c by the relative virtual address 0x0000218c of the MetaData header, and what is in the MetaData by the linear address and size of the MetaData.

Step i, the compression program keeps reading from start of the MetaData header, when reaching the symbol #~, it reads 8 bytes before the symbol #~, of which the first four bytes are address of #~, obtains the #~ stream by its address, and reads 8 bytes of data from start of the fifth prescribed number of bytes (the ninth bytes from start of the #~ stream) in #~ stream, 0x0000000920021c57 (1001001000000000010000111000101011 in binary format).

Step j, the compression program reads data from the lower bit of the binary data obtained in step i.

Specifically, the first bit refers to whether there is the Module table, which is that the value 1 of it refers to yes while 0 refers to no; particularly there is the Module table in the embodiment, the value 1 of the second bit refers to there is the TypeRef table; and so the value 1 of the seventh bit refers to there is the MethodDef table.

In sum, of the data obtained in step i, each bit, from the lower bit beginning, refers to whether there is a relative table in the .net tile;

Step k, the compression program reads number of lines in the TypeDef table after an offset of a sixth prescribed number of bytes from 0x0000000920021c57, and the reading step is reading 4 bytes after an offset of 16 bytes from 0x0000000920021c57 to obtain 0x00000006 which discloses there are 6 lines in TypeDef table.

In the MetaData, every four bytes record the number of lines of all tables available in the .net file after an offset of 8 bytes from 0x0000000900021C57, following the data for disclosing the number of lines is content in each table, which refers to the Tables section.

Step l, the compression program reads what is in the TypeDef table according to a prescribed regular.

Specifically, the prescribed regular is that the compression program reads data for recording the number of the MetaData tables following 0x0000000920021c57 one by one to obtain 0x00000001 and 0x0000001d, adds them and by the adding, determines there are 31 lines in the Module table and TypeRef table before the TypeDef table, of which each line of the Module table occupies 10 bytes and that of the TypeRef table occupies 6 bytes. As a result, data, from start of the 191 byte after an offset of 190 bytes afterwards by 10*1+6*30 in the MetaData tables section, refers to the content in the TypeDef table, of which each line occupies 14 bytes, and thus the size of the TypeDef table is 84 bytes by 14×6, and the data in the TypeDef table is as follows.

000000000100 0000 0000 0100 0100
010010001900 2300 0500 0100 0100
010010003900 2300 0900 0600 0400
010110004000 2300 0D00 0600 0500
010110004000 2300 0D00 0600 0500
000000007102 0000 0900 0700 0700

Specifically, of the above data, prescribed bytes disclose different information, each line refers to one line of the TypeDef table (recording a type name and feature); and for each line, from start of the higher bit, the first four bytes refer to the Flags item, the fifth and sixth bytes refer to the offset of the definition type name in the #Strings stream, and the seventh and eighth bytes are the offset of the Namespace name to which the definition type belongs in the #Strings stream, as shown in table 10.

TABLE 10

| Flags | Name | Namespace | Extends | FieldList | MethodList |
|---|---|---|---|---|---|
| 00000000 | 0001 | 0000 | 0000 | 0001 | 0001 |
| 00100001 | 0019 | 0023 | 0005 | 0001 | 0001 |
| 00100001 | 0039 | 0023 | 0009 | 0006 | 0004 |
| 00100101 | 0040 | 0023 | 000D | 0006 | 0005 |
| 00100001 | 0048 | 0023 | 0009 | 0006 | 0005 |
| 00000000 | 0271 | 0000 | 0009 | 0007 | 0007 |

Specifically, both TypeDef table and TypeRef table refer to type table including Namespace information, and therefore the compression program need obtain the Namespace information from the two tables.

The type count of the Namespace refers to the number of types available in a Namespace. Before the compression program starts the compression, type counts of all Namespaces are set to be 0. In a .net file, the type count of each Namespace is different, viz. each Namespace relates to one type count.

Step 1104, the compression program reads the Namespace name of the type from the MetaData tables.

Specifically for the TypeDef table, the compression program reads a second type from, and the offset 0x0023 of the Namespace to which the second type belongs, according to the structure of the MetaData Tables, which is the offset in the #Strings stream. The compression program obtaining the Namespace name by the offset includes steps of locating the #Strings stream from the MetaData, reading the Namespace information by the offset 0x0023 and the Namespace name from the offset 0x0023 to the first 0x00, 4D79436F6D70616E792E4D794F6E4361726441707000 (MyCompany.MyOnCardApp by ASC II code).

The compression program only reads Namespace name of one type for one time.

The compression program locating the #Strings stream includes steps of keeping reading from address of the MetaData header obtained in step h of step 1102, 0x0000038c, when reaching the symbol #Strings, reading 8 bytes before it to obtain 0x5C0300003C040000, of which the higher four bytes (0x0000035c in a big-endian format) refer to an offset of the #Strings stream relative to the MetaData header and the lower four (0x0000043c in little-endian format) to size of the #Strings stream; obtaining the data section of the #Strings stream after an offset of 0x0000035c from the address of MetaData header 0x0000038c.

Step 1106, the compression program determines whether the read Namespace name is the same with that to which the already-read type belongs, if yes, step 1108 is executed, if not, step 1110 is executed.

Because what is read by the compression program in step 1104 is the Namespace name to which the second type belongs, and there is not a Namespace name for the first type of the TypeDef table, therefore there is not the problem of a repeated Namespace name being read, go to step 1110 and the followings.

Step 1108, add 1 to the type count of the above repeated NameSpaces and go to step 1114.

Step 1110, construct the NameSpace name to a NameSpace string according to a prescribed format.

For differing the file to which the NameSpace belongs and lowering the data collision rate, the NameSpace name obtained in step 1002 is constructed to a NameSpace string according to a prescribed format as specifically shown in the following table 11.

TABLE 11

| PublicKeyToken | Connector (.) | Namespace |
| --- | --- | --- |

Of the table, the PublicKeyToken item refers to a public key token. When signing the HelloWorld program, the .net compiler creates a HelloWorld.snk file including a public key and a private key, compiles the HelloWorld codes to obtain a PE file, performs Hash operation on the PE file, signs the hash value with the private key and embeds the public key (PublicKey) into the PE file. PublicKeyToken is obtained by performing Hash operation on the PublicKey and taking the latest 8 bits of the operation result. Specifically, the PublicKeyToken is 38 05 F8 26 9D 52 A5 B2, the connector is a dot, and thus the Namespace string is 3805F8269D52A5132.MyCompany.MyOnCardApp.

The connector can be a dash, underscore, blank or etc, not limited to a dot.

Specifically, the type count of the NameSpace name is set to be 1, referring to at least one type available the Namespace.

Step 1112, perform hash operation on the Namespace string and take prescribed bits from the string as the compressed Namespace name.

The hash operation can apply algorithm of MD5, SHA-1, SHA-2 or etc. Specifically, the embodiment performs hash operation on the Namespace string 3805F8269D52A5B2.MyCompany.MyOnCardApp with MD5 algorithm and obtains a 120-hit computing result. Further, the embodiment takes the first three bytes of the 120-bit computing result as the compression result. For aligning the bytes, 00 can be added to the compression result to obtain a compressed Namespace name ACE6EB00.

The compressed Namespace name is aligned in a little-endian format, corresponding to 00EBE6AC in a big-endian format. Commonly, data is aligned and stored in big-endian format in a computer while in a little-endian format in an X86-based smart card chip.

Particularly, PublicKeyToken of the Namespace string is sensitive in upper case and little case letter in avoidance that different computing results are obtained by the same PublicKeyToken.

Step 1114, determine whether all Namespace names to which all types belong are read, if yes, go to step 1116; if not, read the name of the Namespace to which the following type belongs, viz. go to step 1104.

Determining whether all names of Namespaces to which all types belong are read includes a step of determining whether all lines of the MetaData tables are read, if yes, it determines all names are read; if not, it determines not all names are read.

Step 1116, combine the compressed Namespace name with the type count thereof, according to a prescribed format, to obtain a compression result of the Namespace.

Specifically, the prescribed format, the structure of the Namespace compressed by the compression program is as shown in table 12

TABLE 12

| Type count | Namespace name |
| --- | --- |

In table 12, the type count refers to the number of all types included in the Namespace.

In step 1114, when names of all Namespaces to which all types belong are read and compressed, the compression results of all Namespace names are obtained, along with the count of types included in all Namespaces.

Specifically for the compression result of the Namespace obtained in step 1112, there are 3 types in the Namespace of MyCompany.MyOnCardApp, and thus the compressed Namespace is 0300 ACE6EB00 in a tiny-endian format.

The compression structure of the Namespace hereon is just a preferred one and can be changed, for example set the type count of the Namespace after the compressed Namespace name, or perform code converting on the value of the type count and etc.

The embodiment just reads one type-related Namespace from the MetaData Tables for explaining the compression of the Namespace. However in practice, one .net file can include one or more Namespaces, each including more types. So the Namespaces corresponding to all types in the MetaData Tables are read, the Namespace names are taken and compressed, types for each Namespace should be counted, and the compressed Namespaces are obtained. The Namespace corresponding to each type in the MetaData table of the .net file can be read by the method hereon.

The below is a compression result of a Namespace in the .net file.

Namespace:
(0)0100 D93DEB00// 367DB8A346085E5D.System.Runtime.Remoting
(1)0100 6E880000// 367DB8A346085E5D.System.Runtime.Remoting.Channels
(2) 0100 1178D900// 367DB8A346085E5D.SmartCard.Runtime.Remoting.Channels.APDU
(3) 0200 00F64D00//D9E1E811B0C FFB39.System
(5) 0100 1C5DD200//367DB8A346085E5D.System
(6) 0400 00F64D00//D9E1E811B0CFFB39.System
(A) 0100 1C5DD200//367DB8A346085E5D.System
(B) 0200C438E300//
(C) B18F1DFA0E7655B MyCompany.MyOnCardApp
(D) 0100 00F64D00//D9E1E811B0CFFB39.System The above result is shown in a tiny-endian format. For the first compression result, 0100 is the count of all types included in the Namespace System.Runtime.Remoting, viz. the Namespace System.Runtime.Remoting includes 0001 types (one type); the following four bytes are the compression result of the Namespaces in the .net file, the bytes after slash-slash are the Namespace string. The following items 1-D all applies the above combination structure, and thus details of it are eliminated.

The method for compressing the Namespaces provided in the embodiment better compress the Namespaces by obtaining the Namespace name and compressing it by a prescribed format, and thus reduces storage space occupies by the .net file. Especially on conditions that the .net file is required to run in a smart card with small storage space, the method makes the .net file able to run in the smart card, and so improves the performance of the smart card.

Embodiment 13

Figure 25:
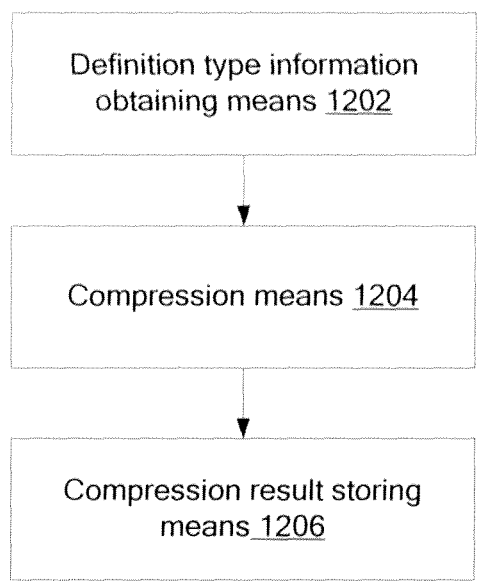
FIG. 25 is a flow chart of a method for compressing definition method in a .net file provided in embodiment 13.

As shown in FIG. 25, a device of compressing the definition type in a .net file is provided in the embodiment, including a definition type information obtaining means 1202 for obtaining the information included in the definition type used in the .net file, and information prescribed by and count of the definition type;

a compression means 1204 for compressing the prescribed information obtained by the definition type information obtaining means 1202;

and a compression result storing means 1206 for storing the prescribed information compressed by the compression means 1204 and the count obtained by the definition type information obtaining means 1202, as the compression result of the definition type.

Specifically, the definition type information obtaining means 1202 executes functions of reading the MetaData table (TypeDef table) where the definition type is available, from the .net file; and obtaining the information included in the definition type used in the .net file from the TypeDef table.

The information included in the definition type includes the token, offsets of name and method, of the definition type, or offset of field of the definition type if fields are used in the definition type.

All the above information can be obtained by reading data from the TypeDef table.

In the TypeDef table, each line of data refers to a definition type, occupying 14 bytes, of which the first four bytes refers to the Flags item, the fifth and sixth bytes refer to the offset of the definition type name in the #Strings stream, the seventh and eighth bytes refer to the offset of name of the Namespace to which the definition type belongs, in the #Strings stream of the .net file, the ninth and tenth bytes refer to the offset of the super class from which the definition type inherits, the eleventh and twelfth bytes refer to the offset of the fields included in the definition type, in the Field table, the thirteenth and fourteenth bytes refer to the offset of the methods included in the definition type, in the Method table.

The prescribed information includes the name and token of the definition type, and information in the fields of the definition type, of which the name can he obtained by the offset of the definition type name from the corresponding stream of the .net file and the information in the fields of the definition type can be obtained by the offset of the fields in the Field table.

The count includes the method reloading information of the definition type, method and field counts and etc., included in the definition type.

The compression means 1204 can choose a prescribed method for the compressed object when compressing prescribed information.

For example, when compressing the definition type token, the compression means 1204 divides it into type token, access flag and description flag, performs OR operation on the three types, and takes the operation result as the compression result of the definition type token.

When compressing the definition type name, the compression means 104 performs Hash operation on it and takes prescribed bytes of the operation result as the compression result of the definition type name.

When compressing information in a field of the definition type (including name, token, type, of the field), the compression means 104 executes one of the following three steps according to it.

One is performing hash operation on the field name and taking prescribed bytes of the hash operation result as a compression result of the field name.

The other is dividing the token in the above field into access flag and description flag, performing OR operation on them, and taking the operation result as a compression result of the field flag.

The other is taking the offset of the above field type in the compressed type as a compression result of the field type.

From the above description, the compressed definition type includes compression results of the definition type name and the type token, field count, method count, method reloading information included in the type, and the information in the field of the type etc. All this information can be arranged in a prescribed format or any order as required.

By compressing all parts of the definition type in the .net file and storing the compression result according to a prescribed format, the embodiment reduces the storage space occupied by the .net file, makes the .net file stored and run on a small-sized storage medium, such as a smart card, and thereby improves the function of the small-sized medium.

Embodiment 14

Figure 26:
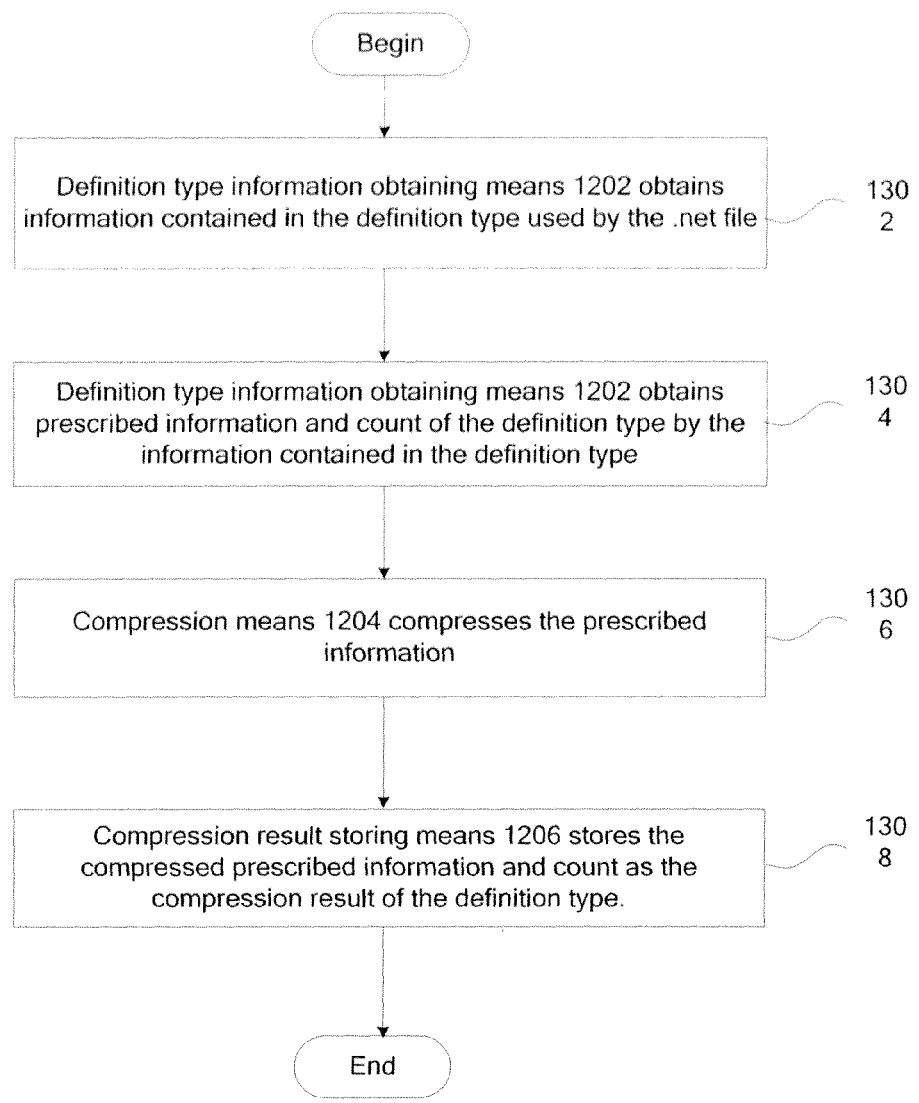
FIG. 26 is a flow chart of a method for compressing definition method in a .net file provided in embodiment 14.

As shown in FIG. 26, a method for compressing the definition type in a .net file is provided in the embodiment, which is executed by the compression device in embodiment 13 and includes steps as follows.

Step 1302, the definition type information obtaining means 1202 obtains the information included in the definition type used by the .net file.

Step 1304, the definition type information obtaining means 1202 obtains the prescribed information and count of the definition type by the information included in the definition type.

Step 1306, the compression module 1204 compresses the prescribed information.

Step 1308, the compression result storing means 1206 stores the compressed prescribed information and count as a compression result of the definition type.

Specifically, the definition type information obtaining means 1202 obtains the information included in the definition type by reading the MetaData table of the definition type in the .net file, TypeDef table, and obtaining the information included in the definition type in the .net file from the TypeDef table.

The information included in the definition type includes the token, offsets of name and method, of the definition type, or offset of field of the definition type if fields are used in the definition type.

All the above information can be obtained by reading data from the TypeDef table.

In the TypeDef table, each line of data refers to a definition type, occupying 14 bytes, of which the first four bytes refers to the Flags item, the fifth and sixth bytes refer to the offset of the definition type name in the #Strings stream, the seventh and eighth bytes refer to the offset of name of the Namespace to which the definition type belongs, in the #Strings stream of the .net file, the ninth and tenth bytes refer to the offset of the super class from which the definition type inherits, the eleventh and twelfth bytes refer to the offset of the fields included in the definition type, in the Field table, the thirteenth and fourteenth bytes refer to the offset of the methods included in the definition type, in the Method table.

The prescribed information and count are the same with those in embodiment 1, and thus details of them are eliminated herein.

Particularly, the definition type token is divided into type token, access flag and description flag.

Correspondingly, the compression means 1204 in Step 1306 compressing the prescribed information includes steps of performing OR operation on the three types of tokens, taking the operation result as the compression result of the definition type token, performing Flash operation on the definition type name and taking prescribed bytes of the hash operation result as the compression result of the definition type name.

The information included in the definition type includes offsets of the fields in the definition type if fields are included in the current definition type of the .net file, and correspondingly the prescribed information further includes names, tokens, types, of the fields, and the count further includes field count of the definition type.

Particularly, the information in a field includes name, token and type of the field, of which the token is divided into access flag and description flag.

And correspondingly, the compression means 1204 in Step 1306 compressing the prescribed information further includes steps of performing Flash operation on the field name, taking prescribed bytes of the operation result as the compressed field name, performing OR operation on the access flag and description flag of the field flag, taking the operation result as the compression result of field flag, and taking the offset of the type of the field in the compressed type as the compression result of the field type.

Particularly, the information included in the definition type includes an offset of the super class which the definition type inherits, and correspondingly the method further includes steps of determining whether the super class which the definition type inherits has been compressed, if yes, obtaining the offset of the inherited super class; if not, compressing the inherited super class and allocating an offset to it; and therefore the compression result of the definition type includes the offset of the compressed super class.

Particularly, the method further includes steps of determining whether the definition type has inherited interfaces, if yes, obtaining the offsets of compressed, inherited interfaces, and number of the inherited interfaces, and correspondingly the compression result of the definition type further includes the offsets of compressed, inherited interfaces, and number of the inherited interfaces.

With the method, the data compressed by each definition type is constructed in an order of hash value of the definition type name, compression result of the type token, the inherited interface count of the type, the offset of the super class which the type inherits, field count, method reloading information, offset of the compressed type where the definition type is, offset of the compressed, inherited interface, information in the field and etc.

Specifically, it is possible that there are more offsets of the interfaces where the type is, items of information in fields of the type, if so, arrange the offsets of the interfaces corresponding to the current definition type, field information in order. Furthermore, the three parts, the offset of the type which the definition type is categorized, offset of the compressed interfaces inherited by the type, information in fields of the type are partly available or completely not available, if they are completely not available, they are not included in the compression result.

By compressing all parts of the definition type in the .net file and storing the compression result according to a prescribed format, the embodiment reduces the storage space occupied by the .net file, makes the .net file stored and run on a small-sized storage medium, such as a smart card, and thereby improves the function of the small-sized medium.

Embodiment 15

A method for compressing definition type in the .net file is provided in the embodiment. The embodiment applies the step of compressing and storing the reference type in the .net file, because the compression result of he reference type is public, it can he used directly.

The embodiment describes the method for compressing the definition type in the .net file by a file compiled by the following codes:

```
namespace MyCompany.MyOnCardApp
{
    public class MyService : MarshalByRefObject
    {
        public String MySampleMethod( )
        {
            String strHello = "Hello World !";
            return strHello + callCount.ToString( );
        }
    }
    public class ClassA
    {
        public class ClassC : ClassB,IA,IB
        {
            static String strField;
            Int32 iField;
            public ClassC(String str1, int i)
            {
                strField = str1;
                iField = i;
            }
            public String TestC( )
            {
                return null;
            }
        }
        private struct StructB
        { }
    }
    public class ClassB
    { }
    public interface IA
    { }
    public interface IB
    { }
}
```

Figure 27:
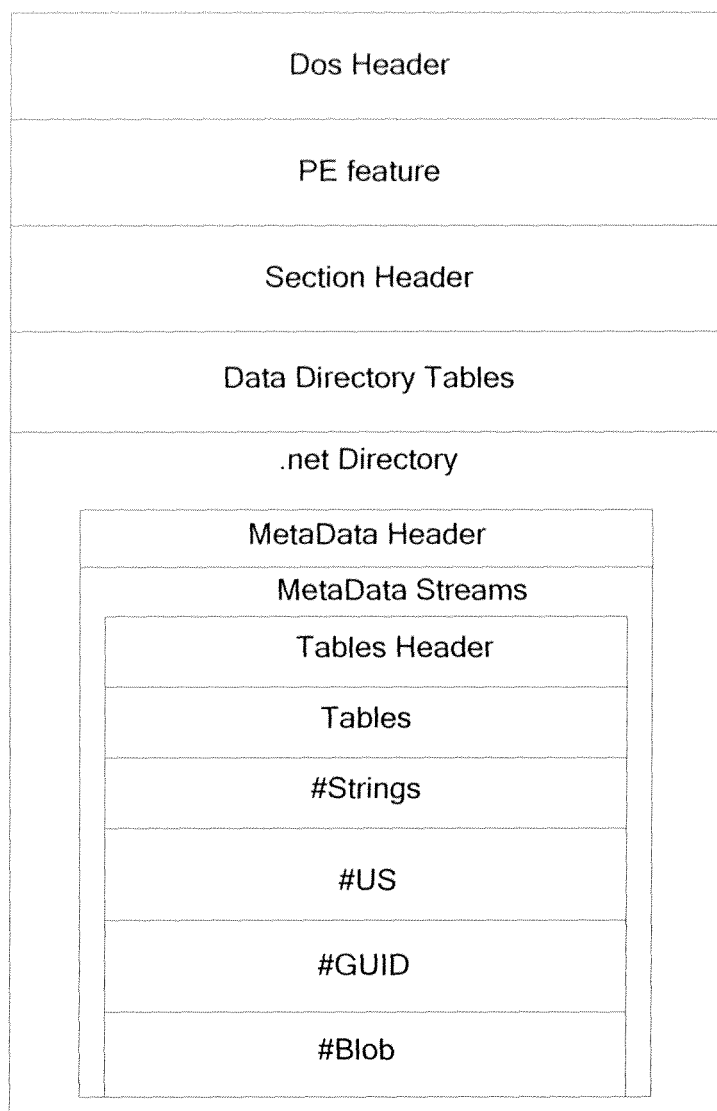
FIG. 27 is a structural diagram of a .net file provided in embodiment 14.

Compiling the hereon codes on the .net platform to obtain a helloworld.exe the and storing the helloworld.exe file in binary format. The binary the is a .net file able to run in a Windows system, complying with Portable Executable format which is an executable tile format of Windows system. The .exe and .dll files are all files in PE formats in Windows system. As shown in FIG. 27, a structural diagram of a .net file, the .net file includes a DOS header, PE feature, and MetaData which includes MetaData Header and MetaData Tables etc.

Figure 28:
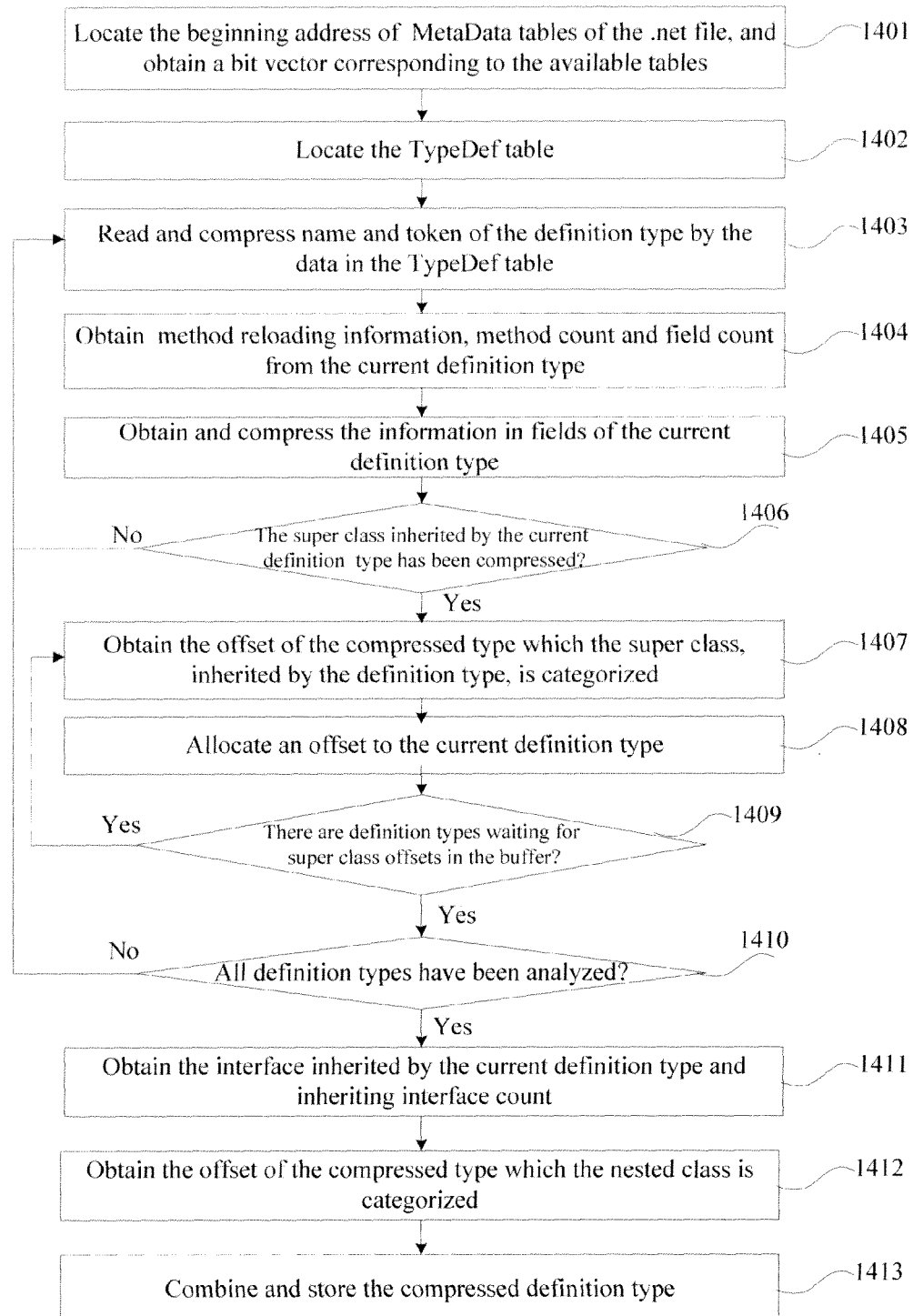
FIG. 28 is a flow chart of a method for compressing definition method in a .net tile provided in embodiment 15.

As shown in FIG. 28, the method for compressing the definition type in a .net file includes steps as follows.

Step 1401, locate the beginning address of the Metadata Tables which are part of the .net file and obtain the bit vector of the available tables from the .net file with the below steps.

Step 1, locate the Dos header of the .net file and obtain the Dos header token 0x5a4d.

Step 2, jump a first prescribed number of bytes, specifically 0x003a bytes, from the DOS header token and read the PE feature offset 0x00000080.

Step 3, locate the PE feature, according to the PE feature offset 0x00000080, to obtain the PE feature 0x00004550.

Step 4, read four bytes after an offset of a second prescribed number of bytes, from the PE feature, which specifically are 0x0074 bytes for a 32-bit machine, and the data read is 0x00000010 which discloses that there are 0x10 directories and .net data in the binary tile, of which the address of the Metadata header of the .net file is written in the 0x0F directory; for a 64-bit machine, the second prescribed number of bytes are 0x0084 bytes.

Step 5, read 8 bytes after an offset of a third prescribed number of bytes, specifically 0x0070 bytes in the embodiment, from 0x00000010; of the 8 bytes, the first four bytes 0x00002008 refer to the relative virtual address of the .net data header in the .net file and the following four bytes 0x00000048 refer to size of the .net data header;

Step 6, obtain the linear address 0x00000208 according to the relative virtual address 0x00002008 of the data header of the .net file, and read the .net data header to obtain the following data 48000000 02000500 0C220000 9C0A0000
09000000 01000006 00000000 00000000
50200000 80000000 00000000 00000000
00000000 00000000 00000000 00000000
00000000 00000000

Particularly, the above data is stored in a tiny-endian format, e.g. the first four bytes of the data 0x48000000 refer to size of it, which is 0x0000048 when stored in a big-endian format In the embodiment, the linear address refers to the address of the .net data in the .net file, the relative virtual address refers to the offset of it from the PE loading point in the memory, and the linear address can be obtained by a formula of the relative virtual address–the relative address of section+ the offset of section; specifically, the relative virtual address of the section of the .net data directory in the .net file is 0x00002000, the offset of the section is 0x00000200, the linear address will be 0x00000208 by 0x00002008–0x00002000+0x00000200.

Step 7, read 8 bytes from the position after an offset of a fourth prescribed number of bytes, particularly 8 bytes, from the .net data header, of which the first four bytes 0x0000220c are the relative virtual address of the Metadata header and the following four bytes 0x00000a9c are size of the MetaData.

Step 8, obtain the linear address 0x0000040c according to the relative virtual address 0x0000220c of the Metadata header and read the Metadata by the linear address and length of the Metadata.

10000010010010000000000010000111110101 0111

Step 9, keep reading from start of MetaData Header, when reaching the symbol read the first eight bytes before the symbol of which the first four refer to the address of the #~ stream and by the address the #~ stream can be obtained, and read data of 8 bytes from start of a fifth prescribed number of bytes in the #~ stream to obtain 0x0000020920021f57 which is 100000100100100000000000010000111110101 0111.

Specifically, the fifth prescribed number of bytes refer to the ninth byte from the beginning address of the #~ stream.

Step 10, read the bit vector corresponding to the available tables from the lower bit, of which each bit refers to a table. If the table is available, the value in the corresponding bit is 1, or else, the value in the corresponding bit is 0.

For example, from the start of the lower bit, the first bit refers to that whether there is a Module table, if the value of it is 1, there is the Module table, if the value of it is 0, there is not the Module table; and for the same reason, if the value of the second bit is 1, there is TypeRef table, and if the value of the third bit is 1, there is TypeDef table.

Step 1402, locate the TypeDef table.

At the ninth byte from the bit vector 0x0000020920021f57 corresponding to the available tables, every four bytes record the number of lines of all Metadata tables available in the .net file. Skip the lines corresponding to the two tables before the TypeDef table, read four bytes of data from the seventeenth byte after the data 0x0000020920021f57, and obtain the data 0x0000000a which refers to that there are 10 lines in the TypeDef table; following the data referring to the number of lines are contents in each table, which correspond to the Metadata tables section.

Reading the contents in the TypeDef table includes steps as follows.

According to the bit vector corresponding to the available tables read in Step 301, there are Module and TypeRef tables before the TypeDef table, of which there is one line of 10 bytes in the Module table and 31 lines of 186 bytes in the TypeRef table. Skip the 60 bytes referring to the number of lines included in a MetaData table, the Module table and TypeRef table, read 10 lines (each of 14 bytes) of the TypeDef table, as follows.

0x00000000001000000000001000100
0x01001000190022000500010 00100
0x010010003800220009000200 0300
0x0100100042002200050007000 0600
0x010010004900220005000700 0700
0xA100000050002200000007000800
0xA100000053002200000007000800
0x02001000560000001400070008 00
0x030110005D0000000D0009000A00
0x00000000083030000050009000A00

In the TypeDef table, data in each line refers to one definition type, of which the first four bytes refer to the definition type flag the fifth and sixth types refer to the offset of the definition type name in the #Strings stream of the .net file, the seventh and eighth bytes refer to the offset of the name of the Namespace which the definition belongs to, in the #Strings stream, the ninth and tenth bytes refer to the information of the super class inherited by the definition type, the eleventh and twelfth bytes refer to the line number of the first field of the definition type in the Field table, and the thirteenth and fourteenth bytes refer to the line number of the first method of the definition type in the Method table.

Particularly, the data size in each line of each table is constant, and therefore the offsets of other tables can be obtained by the bit vector corresponding to the available tables and the number of lines of the tables.

Step 1403, read the flag and name of the definition type according to data in the TypeDef table and compress the flag and name of the definition type respectively.

Firstly, read and compress the definition type flag according to the data in the TypeDef table.

Particularly, read the definition type flag of 4 bytes from the TypeDef table, by which features of all flags can be obtained. Particularly, the definition type flag is divided in to three parts, type flag, access flag and description flag and features of all the flags are redefined. For example, the type flag includes a predefinition type 0x00, a value type 0x01, an enumeration type 0x02, an array type 0x03, a class type 0x04, an interface type 0x05 and a non-proxy pointer type 0x06 etc.; the access flag includes a non-public access type NotPublic, a public access type Public, and for a nested class, the access flag further includes NestedPublic 0x20, NestedPrivate 0x30, NestedFamily 0x40, NestedAssembly 0x50, NestedFamAN-DAssem 0x60, NestedFamORAssem 0x70; and the description flag is for describing the field feature of the current type, i.e. 0x08 refers to that there are non-serializable fields and 0x00 refers to that there are serializable fields.

Particularly, the compressing the definition type flag includes steps of performing OR operation on the type flag, access flag and description flag, and taking the operation result of one byte as the compression result of the definition type flag.

For example, of the definition type ClassC in the 8th line of the TypeDef table read in step 1402, the first four bytes refer to the definition type flag, 0x00100002, it is divided into a type flag 0x04, a NestedPublic flag 0x20 and a description flag 0x00, perform OR operation on them 0x04|0x20|0x00 to obtain 0x24, 0x24 is the compression result of the flag of the definition type ClassC.

Read and compress the definition type name according to the read data in the TypeDef table, viz. read the definition type name according to the offset of the definition type name in #Strings stream.

For example, of the data read from he second line of the TypeDef table, the value in the fifth and sixth bytes is 0x0019, and locate the #Strings stream of the .net file, skip 0x0019 bytes, and keep reading data till reaching 0x00 to obtain 0x4D79536572766572, which is the current definition type name in the TypeDef table, MyServer.

Perform Hash operation on the read definition type name and take the sixth prescribed number of bytes of the operation result as the compression result of the definition type. Particularly the sixth prescribed number of bytes is the first two bytes of the hash operation result, and the hash algorithm can be MD5, SHA-1 or SHA-2 etc.

Specifically in the embodiment, perform hash operation on MyServer with MD5 algorithm to obtain 0x0CBEFBC1EF0639BA18485104440F399C, take the sixth prescribed number of bytes 0x0CBE as the compression result of the current type name MyServer in the TypeDef table.

Further, if the current type is determined as a nestled type according to the current type flag, read name of the type which the current type is categorized, perform hash operation on the combination of name of the type which the current type is categorized and the current type by a connector or direct connection or addition, subtraction or XOR of them, and take the sixth prescribed number of bytes of the operation result as the compression result of the current type.

Specifically for the codes given by the embodiment, because ClassC is nested in ClassA, when Class C is compressed, the compression program links names of ClassA and ClassC together, specifically with a plus sign, performs hash operation on ClassA+ClassC, and takes the first two bytes of the hash operation result as the compression result of the name of ClassC, which avoids the possible repeat in the compression result.

Particularly, for the read ClassA name 0x0042, ClassC name 0x0056, the compression program performs hash operation on ClassA+ClassC with MD5 algorithm to obtain 0x9B8DE23910B330AD80BDB76E7AC19092, of which the first two bytes 0x9B8D are taken as the compression result of the name of ClassC in the TypeDef table.

The locating the #Strings stream in the MetaData section includes steps that after obtaining Metadata header address 0x0000040c in Step 1401, the compression program keeps reading from the start of the Metadata header, when reaching the symbol #Strings, reads 8 bytes before the symbol #Strings to obtain 0x0004 000080040000, of which the higher 4 bytes, 0x00000400 in a big-endian format, discloses the offset of the #Strings stream from the start of the Metadata header, and the lower 4 bytes, 0x00000480 in a tiny-endian format, discloses the size of the #Strings stream; obtains data section of the #Strings stream after an offset of 0x00000400 bytes from the Metadata header address 0x0000040c.

Step 1404, obtain the method reloading information, method count and field count contained in the current definition type.

The obtaining the method count includes steps of reading data of the thirteenth and fourteenth bytes from the line where the current definition type is, which refers to the line number of the first method contained in the definition type in the Method table, reading the line number of the first method contained in the next definition type from the Method table, and taking the value of the later line number minus the former line number as the method count.

The count of all methods contained in the final data line in the TypeDef table is obtained by number of lines in the Method table minus the line number of the first method contained in the data line of the final definition type.

Particularly the line number of the first method, contained in ClassC of the TypeDef table, in the Method table is 0x0008, and the line number of the first method, contained in StructB of the data line next to ClassC, in the Method table is 0x000A, and by 0x000A-0x0008, the count of methods contained in ClassC 0x0002 is obtained.

The method reloading information of the definition type is applied for describing whether there are virtual methods in the current type, if yes, add 1 to the method reloading information, and value of each method reloading information is 0.

Firstly, locate the Method table with similar steps as that of locating the TypeDef table in step 1402, and a summary for it is as follows.

The bit vector corresponding to the available tables read in Step 1401, from lower bit to upper bit, records whether there are corresponding tables, of which the seventh bit discloses whether there is a Method table, particularly in the embodiment the seventh bit 1 means that there is the Method table.

From the start of the ninth byte after the bit vector of the available tables 0x0000020920021f57, every four bytes record the number of lines contained in the available tables in the .net file, particularly according to the hit vector, it is known that there are still four tables before the Method table, skip the four tables, read four bytes at the twenty-fifth byte after 0x0000020920021f57 to obtain 0x00000009, which discloses that there are 9 lines in the Method table.

The reading and obtaining the contents in the Method table particularly is analyzing the bit vector of the available tables and the following data disclosing the number of lines of all Metadata tables and determining that there are Module table of 10 bytes, TypeRef table of 186 bytes, TypeDef table of 140 bytes and Field table of 54 bytes, skipping the above four tables and reading the Method table of 9 lines, totaling 126 bytes; reading the data from the line, according to the line number of the first method contained in the current definition type in the Method table; according to the method token (the seventh and eighth bytes in the Method table refer to a method token), determining whether the current method is a virtual method, if yes, adding 1 to the method reloading information, and if the method count of the current definition type is larger than 1, keeping reading the next line from the Method table till all methods are read and determined.

Particularly, the determining, whether the method in the current definition type is a virtual method includes steps of reading the method token in the current type, and performing AND operation on the method flag and 0x0100, if the operation result is 0x0100, determining the method of the current definition type as a virtual method.

The steps of obtaining the field count from the current definition type are the same with those of obtaining the method count from the current definition type, which are briefed as reading the data stored in the eleventh and twelfth bytes of the line where the current definition type is, from the TypeDef table to obtain the line number of the first field, contained in the current definition type, in the Field table, and reading the line number of the first field, contained in the next of the current definition type stored in eleventh and twelfth bytes of the next line, and taking the result of the later line number minus the former, as the field count of the current type.

Particularly, the line number of the first field contained in ClassC of the TypeDef table in the Field table is 0x0007, and that contained in StructB following ClassC is 0x0009, therefore the field count contained in ClassC is 0x0002 by 0x0009−0x0007.

Step 1405, obtain and compress the information in the field of the current definition type.

The step of reading the Field table is the same as that in step 1402, and in the Field table, each line occupies 6 bytes, of which the first and second bytes store the field flag Flags of the line in Field table, the third and fourth bytes store the field name, and the fifth and sixth bytes store the field signature.

The compressing the information in the field of the current definition type includes steps as follows.

Step 1, obtain and compress the field name.

It includes steps of performing hash operation on the read field name and taking the seventh prescribed number of bytes, specifically the first two bytes of the hash value, of the operation result as the compression result of the field name.

Particularly, there are two fields in ClassC, named strField and iField respectively. The step of compressing the strField field are performing hash operation on it to obtain 0x846461722F82E1CAB3D95632E8424089 and taking the first two bytes 0x8464 as the compression result of the strField field.

Step 2, compress the field flag.

According to the field flag Flags read in the Field table, the field flag can be obtained, which is divided into two parts access flag and description flag, and the compressing the field flag includes performing OR operation on the value of the access flag and description flag to obtain the compression result of the field flag Flags.

| The access flag includes | |
|---|---|
| PrivateScope | PrivateScope=0x00 |
| Private | Private=0x01 |
| Family and assembly | FamANDAssem=0x02 |
| Assembly | Assembly=0x03 |
| Family | Family=0x04 |
| Family or Assembly | FamORAssem=0x05 |
| Public | Public=0x06 |
| The description flag includes | |
| Static | Static=0x10 |
| Initialization only | InitOnly=0x20 |
| Not Serialized | NotSerialized=0x80 |

Particularly, the definition type ClassC contains two fields, strField and iField, it is known that, by analyzing the Flags item of the strField field when compressing its field flag, the access flag of the strField field is Private=0x01, the description flag Static=0x10, and then the compression result of the field flag of the strField field, 0x11, is obtained by performing OR operation on 0x01 and 0x10.

Step 3, obtain the field type.

The field type is stored in the Blob stream. The obtaining the field type includes steps of reading the Signature information of the fourth byte of the current line from the Field table, which is the offset of the field type in the Blob stream, reading data from the Blob stream according to the offset, of which the first byte discloses the size of the following data, the second byte discloses the type of the data (e.g. 0x06 disclose type of the data is field type), the third or fourth byte discloses the field type; searching the corresponding type in the Metadata tables according to the field type disclosed by the third byte or parsing the field type information in the fourth byte to obtain the corresponding type from the Metadata tables, and storing the offset of the compressed type in the Metadata tables as the field type.

The steps of locating the Blob stream are the same as those of locating the Strings stream in step 302, in details are, after obtaining the address of the MetaData header 0x0000040c in step 301, searching from the start of Metadata header, when reaching the symbol Blob (0x23426C6F6), reading 8 bytes of data before the Blob stream to obtain 0xD408000008010000, of which the higher four bytes, 0x000008D4 in a big-endian format, discloses the offset of the Blob stream from the start of Metadata header, and the lower four bytes, 0x0001C8 in a big-endian format, discloses the size of the Blob stream; obtaining the data in the Blob stream after an offset of 0x000008D4 from the Metadata header address 0x0000040c.

Particularly, the obtaining the field type of the strField field from the definition type ClassC includes steps of reading the fourth byte of the strField field from the Field table to obtain 0x000A, reading data at the offset 0x000A in data section of the Blob stream, of which the first byte of data 0x02 discloses two bytes of data required to be read after the data to obtain 0x060E, the second byte of data 0x06 discloses that the data following it refers to the field type, the third byte of data 0x0E discloses that the field type is a string type; and searching the offset of the compressed string type in the TypeRef table to obtain 0x03, storing 0x03 as the field type of the strField field.

Particularly the information in the field of the compressed definition type comprises three parts, compression values of the field name of 2 bytes, of the field flag Flags of 1 byte and of the Signature information of 1 byte. If there are more fields in the current type, store all compressed fields in order.

According to the above method, the compression result of the strField and iField fields contained in ClassC is 0x84641103 F1EC0106.

If there is not a definition field in the current definition type, it is not available in the compressed definition type.

Step 1406, determine whether there is a super class in the current definition type, if yes, and the super class has not been compressed, step 1403 is executed and the super class of the current class is compressed by a recursion method; if not, step 1407 is executed.

Read the ninth and tenth bytes in the line where the current type is from the TypeDef table, if the read data is 0x0000, there is not a super class for the current type and step 1407 is executed; if the read data is not 0x0000, convert the data stored in a tiny-endian format into a big-endian format, viz. after the conversion the data is stored in an order of the higher bytes ranking in front of the lower bytes, shift two bits right of the converted data to obtain the line number of the super class of the current type in the TypeRef table or TypeDef table; perform And operation on the obtained line number and 0x03, if the result is 0, the super class of the current type is in the TypeRef table and step 1407 is executed; if the result is 1, the super class of the current type is in the TypeDef table, obtain type of the line corresponding to the line number in the TypeDef table and if it has been compressed, step 1407 is executed, or else step 1403 is executed.

If the read data is 0x0000, there is not super class inherited by the current type and step 1407 is executed; if the read data of the ninth and tenth bytes in the line where the current type is in TypeDef table is not 0x0000, conver the read data in a tiny-endian format into one in a big-endian format viz. an order of ranking the higher bytes in front of the lower bytes, shift the converted binary data two bits right to obtain the line number of the super class of the current type in TypeRef or TypeDef table; perform And operation on the shifted data and 0x03, if the operation result is 0, the super class of the current type is in TypeRef table and step 1407 is executed; if 1, the super class of the current type is in TypeDef table, search type of the line corresponding to the line in TypeDef table, if it has been compressed, step 1407 is executed, if not, step 1403 is executed.

Step 1407, obtain the offset of the compressed type of the super class inherited by the definition type.

Read the ninth and tenth bytes in the line where the current type is from the TypeDef table, if it is 0x0000, there is not a super class for the current type, store 0xFF (referring to that there is not a super class for the current type); if it is not 0x0000, convert the data stored in a tiny-endian format into data in a big-endian format, viz. after the conversion the data is stored in an order of the higher bytes ranking in front of the lower bytes, shift two bits right of the converted data to obtain the line number of the super class of the current type in the TypeRef table or TypeDef table; perform And operation on the obtained line number and 0x03, if the result is 0, the super class of the current type is in the TypeRef table and step 307 is executed; if the result is 1, the super class of the current type is in the TypeDef table, obtain the offset of the compressed type of the line corresponding to the line number in the TypeDef table and store it as the offset of the super class of ClassC.

The obtaining the super class of ClassC includes steps of reading the ninth and tenth bytes of the line where ClassC is from the TypeDef table, converting the obtained data into a big-endian format to obtain 0x0014, which is 10100 in a binary format, shifting the converted binary data 10100 2 bits right to obtain 101, or 0x05, and performing And operation on 0x05 and 0x03 to obtain a result 0x01, which means the super class of ClassC is in 0x05 line of the TypeDef table, and searching the offset of compressed definition type in 0x05 line of the TypeDef table and taking it as the offset of the super class of ClassC.

Step 1408, allocate an offset for the current definition type.

After compressing all definition types by the above steps, the compress program obtains the compression information from the TypeRef table of the .net file, allocates offsets to the definition types following the offset of the compressed reference type. For example, if the offset of the last compressed reference type in the net file is 0x1A, the offset of the first compressed definition type is 0x1B and the offset of the second compressed definition type 0x1C.

Step 1409, determine whether there is a definition type waiting for the offset of its super class in the buffer, if yes, step 1407 is executed; if not, step 1410 is executed.

Step 1410, determine whether data of all definition types has been analyzed, if yes, step 1411 is executed; if not, step 1403 is executed, and keep compressing all the rest definition types in the TypeDef table.

Step 1411, obtain offsets of the interfaces inherited by the current definition type, and number of the inherited interfaces.

After data in all definition types has been processed, offsets of the interfaces inherited by the current definition type, and number of the inherited interfaces are obtained by retrieving the data in the InterfaceImpl table.

The step of reading the InterfaceImpl table is the same as that in step 1402 after locating the InterfaceImpl table according to the bit vector of the available tables.

In the InterfaceImpl table, each line occupies four bytes, of which the first and second bytes disclose the line of the type inheriting the interface in the TypeDef table, and the third and fourth bytes are converted into binary data and shifted 2 hits right to obtain a value corresponding to the line of the interface type in the TypeDef table.

Obtain the interface type inherited by each definition type in the TypeDef table and number of the inherited interfaces, according to the information read from the InterfaceImpl table, and the offset of the compressed interface type.

If the current definition type does not inherit any interface, the number of the interfaces in the compressed definition type is 0x00 and the interface-related information is not available.

Step 1412, obtain the offset of the compressed type which the nested class is categorized.

Determine whether the current type is a nested class according to the flag of the current definition type, if yes, obtain the offset of the type which in the current nested class is categorized; if not, there is not a nested class in the compressed definition type.

Determine whether the current type is a nested class according to the flag of the 4-byte definition type read from the TypeDef table in Step 1403, if yes, read information from the NestedClass table by steps of locating the NestedClass table with the same method as that in step 1402 according to the bit vector of the available tables and reading the NestedClass table.

There are four bytes in each line of the NestedClass table, of which the first and second disclose the line of the current nested class in the TypeDef table, and the third and fourth bytes EnclosingClass disclose the line of the type where the current definition type is in the TypeDef table.

Search the line of the type where the current type is in the TypeDef table, obtain the offset of the compressed type where the current type is, and take it as the type where the current nested class is.

Step 1413, combine and store data of the compressed definition type.

Combine data of each compressed definition type in an order of hash value of definition type name, compression result of the type flag, count of the interfaces inherited by the type, offset of the super class of the type, field count contained in the type, method reloading information of the type, offset of the type where the nested class is, offset of the interface where the type is, information in the field of the type.

Specifically, it is possible that there are more offsets of the interfaces where the type is, items of information in fields of the type, if so, arrange the offsets of the interfaces corresponding to the current definition type, field information in order. Furthermore, the three parts, the offset of the type which the nested class is categorized, the offset of the interface inherited by the type, information in fields of the type, are partly available or completely not available, if they are completely not available, they are not included in the compression result.

For example, according to the codes provided in the embodiment, the compression result of ClassC is 0x9B8D240216020200171819F1EC010684641103.

For a clear show of the above compression result, the above codes will be stored in a structure of table 13, referring to the structure of the compression result of the definition type ClassC.

TABLE 13

| Classifications by the compressed parts of the definition type ClassC | Value of the compressed ClassC |
|---|---|
| Definition type name | 9B8D |
| Definition type flag | 24 |
| Inherited interface count | 02 |
| Inheriting super class offset | 16 |
| Field count of the definition type | 02 |
| Method count of the definition type | 02 |

TABLE 13-continued

| Classifications by the compressed parts of the definition type ClassC | Value of the compressed ClassC |
|---|---|
| Method reloading information | 00 |
| Offset of the type which the nested class is categorized | 17 |
| Inherited interface offset | 18, 19 |
| Information in the definition field | F1EC 01 06, 8464 11 03 |

After all definition types in the .net file are compressed, they are stored by the allocated offsets.

The data to be compressed in the embodiment is binary data compiled by the codes programmed in a .net structure, and with the method provided herein, the compression rate of the definition type reaches 30 percent at maximum, which reduces the storage space occupied by the .net file efficiently, makes it run and stored in a small-sized medium, such as a smart card, and therefore improves the function of the small-sized medium.

The compression method or device in the embodiment efficiently reduces the storage space taken by the .net file, makes it used in all types of devices, which not only saves the resources, but also improves the resource utilization of the resource. Obviously, all those skilled in prior art should know that all means or steps can be realized by one or more common computing devices, for example, they can be integrated into one computing device or distributed on a network including more computing devices; alternatively, they can also be realized by programs run on a computing device, and therefore they can he stored in a storage device and run by a computing device, or they can he made up of one or more integrated circuit modules. Thus, the invention is not limited to any combination of special hardware and software.

The above described are only preferred embodiments, not a limitation to the invention, and therefore for those skilled in prior art, any modifications and changes to the invention are acceptable. All modifications, substitutions, improvements within the principle of the invention will fall below the protection scope of the invention.

The invention claimed is:

1. A method for compressing a non-compressed file compiled by a .net platform, wherein the method comprises the steps of:
obtaining and compressing a reference type in the non-compressed file compiled by the .net platform;
obtaining and compressing a definition method in the non-compressed file compiled by the .net platform;
obtaining and compressing a method body of the definition method in the non-compressed file compiled by the .net platform;
obtaining and compressing a Namespace in the non-compressed file compiled by the .net platform; and
obtaining and compressing a definition type in the non-compressed file compiled by the .net platform,
wherein the obtaining and compressing the reference type in the non-compressed file compiled by the .net platform comprises the steps of:
obtaining and compressing a name of the reference type used in the non-compressed file compiled by the .net platform to obtain a compressed name of the reference type, counting methods and fields in the reference type, combining the compressed name with the method and field counts in the reference type according to a predetermined format, to obtain a compression result of the reference type,
wherein the obtaining and compressing the method body of the definition method comprises the steps of:
obtaining a header of the definition method from the non-compressed file compiled by the .net platform;
compressing the method body of the definition method and obtaining a compression result of the method body;
the method further comprises a step of determining whether method headers of all definition methods in the non-compressed file compiled by the .net platform have been read and all corresponding method bodies have been compressed, if not, keeping reading the header of the next definition method; if yes, ending the compression,
wherein the compressing the method body of the definition method comprises the steps of:
obtaining local variables of the definition method according to the header of the definition method, and an offset of the local variables, referring to the offset of the local variables in a compressed structure corresponding to the non-compressed file compiled by the .net platform, according to a type of the local variables;
reading an ILcode of the definition method according to the header of the definition method, compressing the ILcode and computing a length of the compressed ILcode;
combining the length of the compressed ILcode, offset of the local variables and compressed ILcode according to a predefine form to obtain a compression result of the method body;
the wherein compressing the ILcode comprises the steps of:
reading an instruction from the ILcode and determining whether there is a parameter with the instruction, if not, recording the instruction directly;
if yes, further determining a type of the parameter,
if the parameter is a jump offset, obtaining a jumped ILcode according to the jump offset, computing the jump offset according to the jumped ILcode, recording the instruction and computed jump offset;
if the parameter is an offset of the local variables in the method body, recording the instruction and parameter;
if the parameter is a token, obtaining an offset of the token in the compressed structure, recording the instruction and obtained offset;
the wherein compressing the ILcode further comprises the steps of:
determining whether all the instructions and parameters in the ILcode have been read and compressed, if yes, computing the length of the compressed ILcode; if not, reading and compressing the following instruction;
wherein the obtaining and compressing the definition type in the non-compressed file compiled by the .net platform comprises the steps of:
obtaining information included in the definition type of the non-compressed file compiled by the .net platform;
obtaining a prescribed information and count according to the information included in the definition type;
compressing the prescribed information;
taking the compressed prescribed information and count as a compression result of the definition type and storing it,
wherein the information included in the definition type comprises a token, a name offset and a method offset of the definition type;
accordingly the prescribed information comprises a token and a name of the definition type;
the count comprises method reloading information and method count of the definition type;

the definition type token is divided into three types, class token, access token and description token;

accordingly, the compressing the prescribed information comprises the steps of:

performing an OR operation on the class token, access token and description token and taking a result of the OR operation as a compression result of the definition type token;

performing a hash operation on the definition type name and taking prescribed bytes of a result of the hash operation as a compression result of the definition type name.

2. The method of claim 1, wherein the obtaining the name of the reference type used in the non-compressed file compiled by the .net platform comprises the steps of:

obtaining a first MetaData table in the non-compressed file compiled by the .net platform;

reading address information of the name of the reference type used in the non-compressed file compiled by the .net platform from the first Metadata table; and reading the name of the reference type according to the address information.

3. The method of claim 1, wherein the obtaining and compressing the name of the reference type in the non-compressed file compiled by the .net platform comprises the steps of:

obtaining the name of the reference type used in the non-compressed file compiled by the .net platform;

creating and then compressing a reference type name string according to the obtained reference type name, and the creating the reference type name string according to the obtained reference type name comprises:

a step of converting the obtained reference type name into a prescribed coding format so as to create the reference type name string;

or obtaining a name of a Namespace to which the reference type belongs and combining the Namespace name with the reference type name to create the reference type name string;

wherein the compressing the reference type name string comprises the steps of:

performing a Hash operation on the reference type name string to obtain a hash value; and taking prescribed bytes of the hash value as the compressed name of the reference type.

4. The method of claim 1, wherein obtaining the method and field counts in the reference type comprises the steps of:

obtaining a second MetaData table;

processing data in each line of the second MetaData table with the following steps:

reading the reference type to which the data in the current line of the second MetaData table points, wherein in case of the name of the reference type to which the data in the current line points being concurrent with the obtained reference type name, determining whether the data recorded in the current line represents a method according to a Signature value of the data in the current line, if yes, adding 1 to the method count of the reference type, or else, adding 1 to the field count of the reference type.

5. The method of claim 1, wherein the predetermined format is fixed-length bytes, which comprises three parts, firstly the compressed reference type name, secondly the method count, and thirdly the field count.

6. The method of claim 1, wherein the obtaining and compressing the definition method in the non-compressed file compiled by the .net platform comprises the steps of:

locating the non-compressed file compiled by the .net platform;

locating a MethodDef table in MetaData tables and corresponding streams in the non-compressed file compiled by the .net platform;

constructing a string with content of a corresponding item of each definition method in the stream according to the MethodDef table, and the content of the item comprises a parameter count;

performing a hash operation on the string for converting it into a name hash value;

compressing an implementation flag and an access flag of the definition method;

compressing a parameter list of the definition method in the stream; and combining the name hash value, compressed implementation flag and access flag, parameter count and compressed parameter list together according to a prescribed rule, to obtain a compressed structure.

7. The method of claim 6, wherein the locating a MethodDef table in the Metadata tables and corresponding streams in the non-compressed file compiled by the .net platform comprises the steps of:

obtaining stream addresses and stream sizes according to what is in the non-compressed file compiled by the .net platform header;

locating an offset of the MethodDef table in the MetaData streams according to a bit vector in a header of the MetaData streams and what is in a table count.

8. The method of claim 6, wherein the constructing the string with the content of the corresponding item of each definition method in the stream according to the MethodDef table comprises the steps of:

reading a value of a Name item from the item, and data of a String stream according to the value to obtain the definition method name;

reading a value of a Signature item from the item, and data of a Blob stream according to the value of the Signature item, and analyzing parameter information of the definition method and returning a value type according to the data;

obtaining type information to which the returned value type points from a TypeDef table or a TypeRef table in the MetaData tables, and reading the type name and Namespace name from the String stream according to an offsets recorded in the Name item and Namespace item of the items of the type;

constructing a returning value full-name string with the Namespace name and type name;

reading a parameter type name and the Namespace name respectively, according to a parameter type in the obtained parameter information, and constructing a parameter full-name string with the read data;

constructing a string with the obtained returning value full-name string, the definition method name and parameter full-name string;

wherein the compressing the parameter list of the definition method comprises the steps of:

locating a parameter line corresponding to the parameter list in the MetaData tables according to a value of a ParaList item;

reading data in the corresponding parameter line, which comprises 2 bytes of a Flags item, Sequence item and Name item;

compressing data in the parameter line, viz. deleting the Sequence item and the Name item, and compressing data in the Flags item into 1 byte;

analyzing and obtaining a parameter line flag from the data in the Flags item;

combining the parameter line flag with an offset of the parameter type of the item in a type storage area to obtain parameter information; and adding the parameter information to the compressed structure.

9. The method of claim 6, wherein the performing the hash operation on the string for converting it into the name hash value comprises the steps of:

performing the hash operation on the string;

obtaining first two bits of the hash operation result and converting it into a value type and storing it, and taking the stored data as the name hash value of the definition method.

10. The method of claim 6, wherein the compressing the implementation flag and the access flag of the definition method comprises the steps of recombining items in the implementation flag and access flag from 4 bytes to 2 bytes viz. deleting part of the items.

11. The method of claim 6, wherein the compressing the definition method in the non-compressed file compiled by the .net platform further comprises the steps of:

determining that the definition method is a fat-header method; compressing local variables in the fat-header method; and adding a local variable count and compressed local variables to the compression structure;

wherein the compressing local variables in the fat-header method comprises the steps of:

analyzing type-related information in the fat-header method so as to obtain a maximum stack size and a fat-header token;

compressing data for describing the maximum stack size viz. retaining a lower 8 bits and deleting a higher 8 bits of a 16-bit data;

analyzing the fat-header token and obtaining a local variable signature token for obtaining a number of the local variables;

analyzing the fat-header token for obtaining a structured exception count and exceptions and compressing the exceptions;

if there are exception handling tables following the ILcode in the fat-header method, compressing the exceptions by following the steps of:

analyzing the fat-header token to obtain a byte length and code size of a header of the fat-header method;

locating an exception handling table according to the byte length and code size of the header of the fat-header method;

locating what is in an exception handling section according to an offset for storing the exception handling sections;

compressing each exception handling section by the steps of:

if the exception in the current exception handling section is in a fat form, storage size occupied by the exception in the current exception handling section referring to a first length, and reading items in the method body section, deleting a HandlerLength item, compressing values respectively in an TryOffset item, a TryLength item and a HandlerOffset item into 2 bytes by deleting high bits and retaining low bits of the values, compressing 4 bytes of data in a ClassToken item into 1 byte by deleting high bits and retaining a low 8 bits of the data only;

if the exception in the current exception handling section is in a small form, storage size occupied by the exception in the current exception handling section referring to a second length, reading items in the method body section and deleting the HandlerLength item;

obtaining a corresponding exception clause from TypeDef and TypeRef tables of the Metadata tables according to the ClassToken item obtained by the above step;

after the compressing local variables of the fat-header method, a step is further comprised of obtaining a garbage collection token and Finally count, and constructing a fat-header method structure table with the garbage collection token, maximum stack size, Finally count, exception count and compressed exceptions; and adding the fat-header method structure table to the compression structure.

12. The method of claim 1, wherein:

the obtaining the local variables of the definition method according to the method header comprises the steps of:

reading a first byte of the method header, determining whether the definition method is a fat-header method or a tiny-header method according to the first byte, if the definition method is a fat-header method, obtaining local variables according to a local variable token in the fat-header method; if the definition method is a tiny-header method, clearing the local variables;

and in the method, all data in the compressed structure of the non-compressed file compiled by the .net platform is ordering and offset of each line concurs with a line token;

wherein the reading ILcode of the definition method according to the method header comprises the steps of:

obtaining an ILcode length of the definition method according to what is in the method header;

reading the ILcode according to the obtained ILcode length and in the method, the prescribed format refers to ordering the ILcode length, local variables offset and compressed ILcode.

13. The method of claim 1, wherein the obtaining the header of the definition method from the non-compressed file compiled by the .net platform comprises the steps of:

obtaining a MethodDef table in the non-compressed file compiled by the .net platform;

reading an address of the header of the definition method in the non-compressed file compiled by the .net platform from the MethodDef table; and reading the header of the definition method according to the address.

14. The method of claim 1, wherein the obtaining and compressing the Namespace in the non-compressed file compiled by the .net platform comprises the steps of:

obtaining a name of the Namespace to which the current type belongs from the non-compressed file compiled by the .net platform;

compressing the Namespace name according to a prescribed algorithm;

obtaining a type count, corresponding to the Namespace name, which refers to a number of types in the Namespace;

combining the compressed Namespace name with the type count, according to a prescribed format, to obtain a compression result of the Namespace corresponding to the Namespace name;

after the step of obtaining the name of the Namespace to which the current type belongs from the non-compressed file compiled by the .net platform, a further step is determining whether the currently obtained Namespace name has been obtained, if not, compressing the Namespace name according to the prescribed algorithm;

the method further comprises the steps of determining whether names of all Namespaces to which all types belong, have been read;
if yes, combining the compressed Namespace name with the type count according to the prescribed format;
if not, reading the name of the Namespace to which the following type belongs.

15. The method of claim 14, wherein the obtaining the name of the Namespace to which the current type belongs from the non-compressed file compiled by the .net platform comprises the steps of:
obtaining the MetaData tables comprising an offset of the Namespace name, from the non-compressed file compiled by the .net platform;
obtaining the offset of the name of the Namespace to which the current type belongs, from the Metadata tables;
reading the name of the Namespace from a "#Strings" stream according to the offset of the Namespace name;
the obtaining a type count corresponding to the Namespace name comprises the steps of:
if the Namespace name is obtained for a first time, setting the type count corresponding to the Namespace name, to be 1, and keeping adding 1 to the type count each time when a Namespace name is obtained till all the MetaData tables are traversed;
and particularly, the Metadata tables comprise TypeDef and TypeRef tables.

16. The method of claim 14, wherein the compressing the Namespace name according to the prescribed algorithm comprises the steps of:
constructing a Namespace string with the Namespace name;
performing a Hash operation on the Namespace string to obtain a hash value;
taking prescribed bytes of the hash value as the compressed Namespace name;
the constructing the Namespace string with the Namespace name comprises:
connecting a public key token of the non-compressed file compiled by the .net platform with the Namespace name to obtain the Namespace string with a connector.

17. The method of claim 14, wherein the prescribed format is fixed-length bytes, of which one part of the bytes refer to the type count and another to the compressed Namespace name following the type count.

18. The method of claim 1, wherein the obtaining information included in the definition type of the non-compressed file compiled by the .net platform comprises the steps of:
reading MetaData tables where the definition type of the non-compressed file compiled by the .net platform is; and
obtaining information included in the definition type used by the non-compressed file compiled by the .net platform from the MetaData tables where the definition type is.

19. The method of claim 1, wherein:
information included in the definition type further comprises an offset of all fields in the definition type;
accordingly the prescribed information further comprises field-related information in the definition type;
the count further comprises a field count in the definition type;
the field-related information in the definition type comprises a name, field token and type of a field, of which the field token comprises an access token and a description token;
accordingly the compressing the prescribed information comprises the steps of:
performing a hash operation on the field name and taking prescribed bytes of the hash operation result as a compression result of the field name;
performing an OR operation on the access token and description token of the field token and taking the OR operation result as a compression result of the field token;
and taking an offset of the compressed type corresponding to the field type as a compression result of the field type.

20. The method of claim 1, wherein the information included in the definition type comprises an offset of a super-class inherited by the definition type;
accordingly, the method further comprises the steps of determining whether the super class inherited by the definition type has been compressed, if yes, obtaining an offset of the super-class; if not, compressing the super-class and assigning an offset to the super-class;
accordingly, the compression result of the definition type further comprises the offset of the compressed super-class.

21. The method of claim 1, wherein the method further comprises the steps of determining whether the definition type has inherited interfaces, if yes, obtaining an offset of the compressed interfaces inherited by the definition type and a number of the inherited interfaces which both are comprised in the compression result of the definition type.

22. The method of claim 1, wherein the method further comprises the steps of:
determining whether the definition type is a nested type, if yes, obtaining an offset of the compressed type where the definition type is;
accordingly, the compression result of the definition type further comprises the offset of the compressed type where the nested type is.

* * * * *